(12) United States Patent
Atkinson

(10) Patent No.: US 11,495,018 B2
(45) Date of Patent: Nov. 8, 2022

(54) AUGMENTED REALITY SYSTEM FOR FACILITATING ITEM RELOCATION VIA AUGMENTED REALITY CUES AND LOCATION BASED CONFIRMATION

(71) Applicant: Stamps.com Inc., El Segundo, CA (US)

(72) Inventor: Charles Atkinson, El Segundo, CA (US)

(73) Assignee: STAMPS.COM INC., El Segundo, CA (US)

( * ) Notice: Subject to any disclaimer, the term of this patent is extended or adjusted under 35 U.S.C. 154(b) by 275 days.

(21) Appl. No.: 16/983,877

(22) Filed: Aug. 3, 2020

(65) Prior Publication Data

US 2020/0364459 A1 Nov. 19, 2020

Related U.S. Application Data

(63) Continuation-in-part of application No. 15/628,323, filed on Jun. 20, 2017, now abandoned.

(51) Int. Cl.
*G06K 9/00* (2022.01)
*G06T 19/00* (2011.01)
(Continued)

(52) U.S. Cl.
CPC ........... *G06V 20/20* (2022.01); *G06K 9/6201* (2013.01); *G06N 20/00* (2019.01); *G06Q 50/28* (2013.01); *G06T 19/006* (2013.01)

(58) Field of Classification Search
CPC ............... G06F 2111/18; G06F 3/0481; G06F 3/04817; G06F 9/4443; G06F 3/04847;
(Continued)

(56) References Cited

U.S. PATENT DOCUMENTS

2004/0148217 A1 7/2004 Lauring et al.
2006/0229895 A1 10/2006 Kodger, Jr.
(Continued)

OTHER PUBLICATIONS

European Search Report dated Dec. 2, 2021, issued in the corresponding European Patent Application No. 18821322.7, pp. 1-11.
(Continued)

*Primary Examiner* — Todd Buttram
(74) *Attorney, Agent, or Firm* — Pillsbury Winthrop Shaw Pittman, LLP

(57) ABSTRACT

In certain embodiments, item relocation may be facilitated via augmented reality cues and location-based confirmation. In some embodiments, in response to a detection of a first pattern in a live video stream obtained at a client device, a first location associated with the client device may be obtained, and an augmented reality presentation of a visual directional cue may be presented on a user interface of the client device such that the visual directional cue is overlaid on the live video stream. The visual directional cue may include visual directions from the first location to a destination location. In response to an indication that the item has been relocated to the destination location, a determination may be made as to whether the client device is within a threshold distance from the destination location. A confirmation may be generated in response to the client device being within the threshold distance.

20 Claims, 11 Drawing Sheets

(51) Int. Cl.
  *G06K 9/62* (2022.01)
  *G06Q 50/28* (2012.01)
  *G06N 20/00* (2019.01)
  *G06V 20/20* (2022.01)

(58) Field of Classification Search
  CPC .... G06F 11/3664; G06F 3/012; G06F 3/0304; G06F 3/011–015; G06T 19/00; G06T 17/00; G06T 7/00; G06T 19/006; G06T 2215/16; H04N 5/272; H04N 2201/3245; A63F 13/10; G02B 27/017
  See application file for complete search history.

(56) References Cited

U.S. PATENT DOCUMENTS

| | | |
|---|---|---|
| 2006/0250249 A1 | 11/2006 | Cheng |
| 2009/0146832 A1 | 6/2009 | Ebert et al. |
| 2010/0274609 A1 | 10/2010 | Shoemaker et al. |
| 2011/0133888 A1 | 6/2011 | Stevens et al. |
| 2011/0307424 A1 | 12/2011 | Jin et al. |
| 2015/0154525 A1 | 6/2015 | Wappler et al. |
| 2017/0154347 A1 | 6/2017 | Bateman |
| 2017/0164319 A1 | 6/2017 | Skaaksrud et al. |
| 2017/0228687 A1 | 8/2017 | Stephen et al. |
| 2020/0364459 A1* | 11/2020 | Atkinson ............... G06V 20/20 |

OTHER PUBLICATIONS

International Preliminary Report on Patentability issued in corresponding International Application No. PCT/US2018/038514 dated Jan. 2, 2020.

International Search Report and Written Opinion issued in corresponding International Application No. PCT/US2018/038514 dated Oct. 19, 2018.

* cited by examiner

AUGMENTED REALITY SYSTEM FOR FACILITATING ITEM RELOCATION VIA AUGMENTED REALITY CUES AND LOCATION BASED CONFIRMATION

RELATED APPLICATION(S)

This application is a continuation-in-part of U.S. patent application Ser. No. 15/628,323, filed on Jun. 20, 2017, which is incorporated herein by reference in its entirety.

FIELD OF THE INVENTION

The invention relates to facilitating item relocation or other item-related guidance, including, for example, item relocation or guidance via augmented reality cues or location-based confirmation.

SUMMARY OF THE INVENTION

Aspects of the invention relate to methods, apparatuses, and/or systems for facilitating item relocation via augmented reality cues and location-based confirmation.

In some embodiments, a live video stream may be obtained from a client device (e.g., a wearable device), and the live video stream may be continuously monitored for one or more patterns. In response to a detection of a first pattern in the live video stream, a first location associated with the client device may be obtained and an augmented reality presentation of a visual directional cue may be presented on a user interface of the client device such that the visual directional cue is overlaid on the live video stream. The visual directional cue may include visual directions from the first location associated with the client device to a second location (e.g., a destination location for relocating an item associated with the detected first pattern). In response to an indication (e.g., obtained from the client device) that the item has been relocated to the second location (e.g., the destination location), a determination may be made as to whether the client device is within a threshold distance from the second location (e.g., the destination location). In response to a determination that the client device is within a threshold distance from the second location (e.g., the destination location), a confirmation may be generated. This confirmation confirms that the item has indeed been relocated to its destination location.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
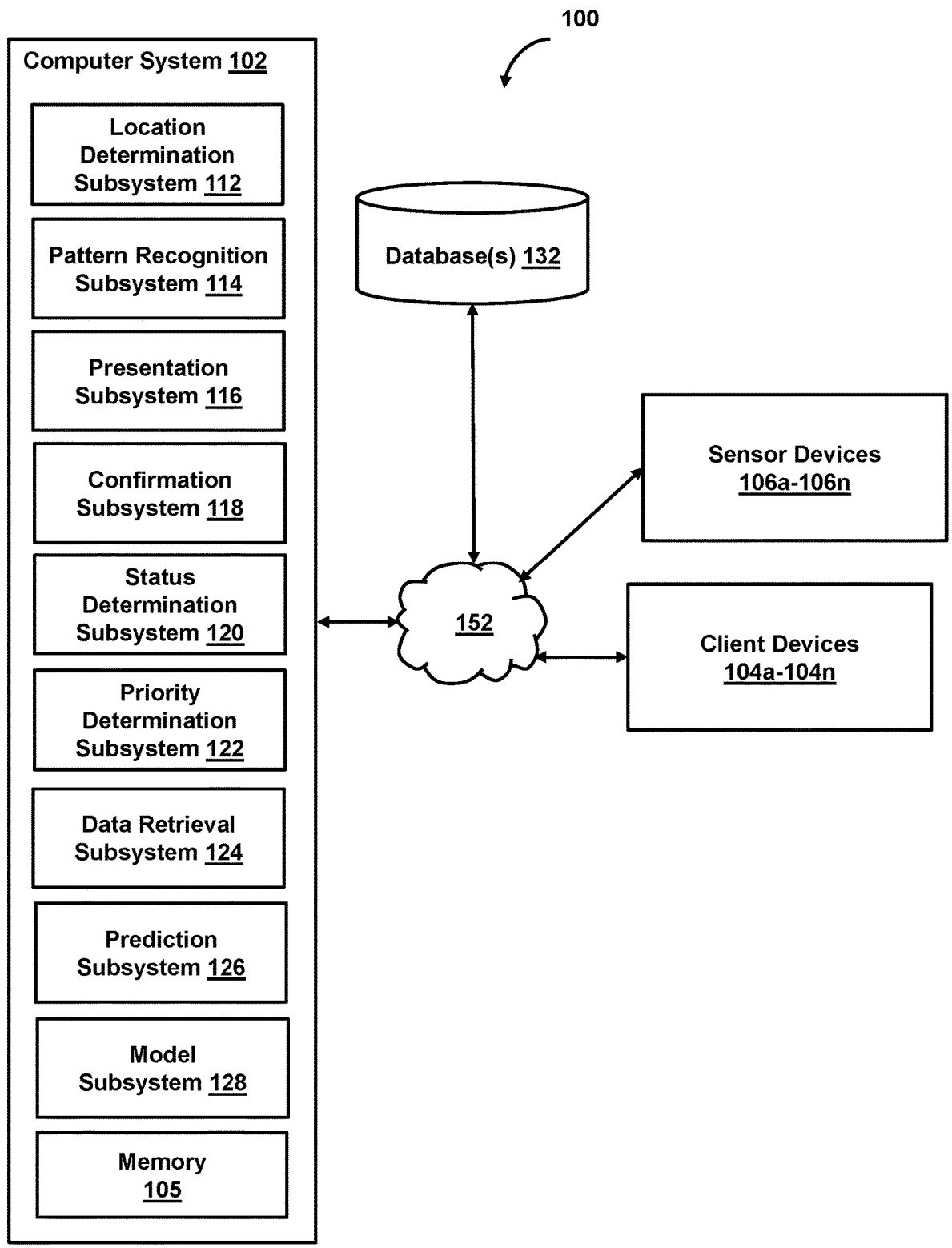
FIG. 1 shows a system facilitating item relocation or other item-related guidance via augmented reality cues or location-based confirmation, in accordance with one or more embodiments.

FIG. 1 shows a system 100 for facilitating item relocation or other item-related guidance via augmented reality cues or location-based confirmation, in accordance with one or more embodiments. In some embodiments, a live video stream may be obtained from a client device (e.g., a wearable device), and the live video stream may be continuously monitored for one or more patterns. In response to a detection of a first pattern in the live video stream, a first location associated with the client device may be obtained and an augmented reality presentation of a visual directional cue may be presented on a user interface of the client device such that the visual directional cue is overlaid on the live video stream. The visual directional cue may include visual directions from the first location associated with the client device to a second location (e.g., a destination location for relocating an item associated with the detected first pattern). In response to an indication (e.g., obtained from the client device) that the item has been relocated to the second location (e.g., the destination location), a determination may be made as to whether the client device is within a threshold distance from the second location (e.g., the destination location). In response to a determination that the client device is within a threshold distance from the second location (e.g., the destination location), a confirmation may be generated. This confirmation confirms that the item has indeed been relocated to its destination location.

As shown in FIG. 1, system 100 may include computer system 102 (e.g., one or more servers), client device 104 (or client devices 104a-104n), sensor devices 106 (or sensor devices 106a-106n), database 132, or other components. Computer system 102 may include a location determination subsystem 112, pattern recognition subsystem 114, presentation subsystem 116, confirmation subsystem 118, status determination subsystem 120, priority determination subsystem 122, data retrieval subsystem 124, prediction subsystem 126, model subsystem 128, memory 105, or other components. Client device 104 (also referred to as a physical device, a wearable device, or a user device) may include any type of mobile terminal, fixed terminal, or other device. By way of example, client device 104 may include a desktop computer, a notebook computer, a tablet computer, a smartphone, a wearable device (e.g., a VR/AR headset, eye wear, or other wearable device), or other physical client device. In some embodiments, one or more of the foregoing client devices 104 may include one or more sensor devices 106.

Users may, for instance, utilize one or more client devices 104 to interact with one another, one or more computer systems 102, or other components of system 100. It should be noted that, while one or more operations are described herein as being performed by components of computer system 102, those operations may, in some embodiments, be performed by components of client device 104 or other components of system 100 and while one or more operations are described herein as being performed by components of client device 104, those operations may, in some embodiments, be performed by components of computer system 102 or other components of system 100.

In some embodiments, the computer system 102 (e.g., pattern recognition subsystem 114) may obtain a video stream (e.g., a live video stream) or one or more images representative of an environment in which a client device 104 is located. For example, the client device 104 may include a camera (or may be associated with a camera), and the video stream or images from such a camera may be obtained from the client device 104 (or the camera associated with the client device 104). Although a client device 104 may include a camera, it should be understood that the client device 104 may be separate from a camera and may communicate with a camera. As noted above, the video stream or images obtained by the computer system 102 may be representative of the environment in which a client device 104 is located. For example, a client device 104 may be located in a warehouse or a building, and the video stream or images may be representative of the warehouse or the building.

Figure 2:
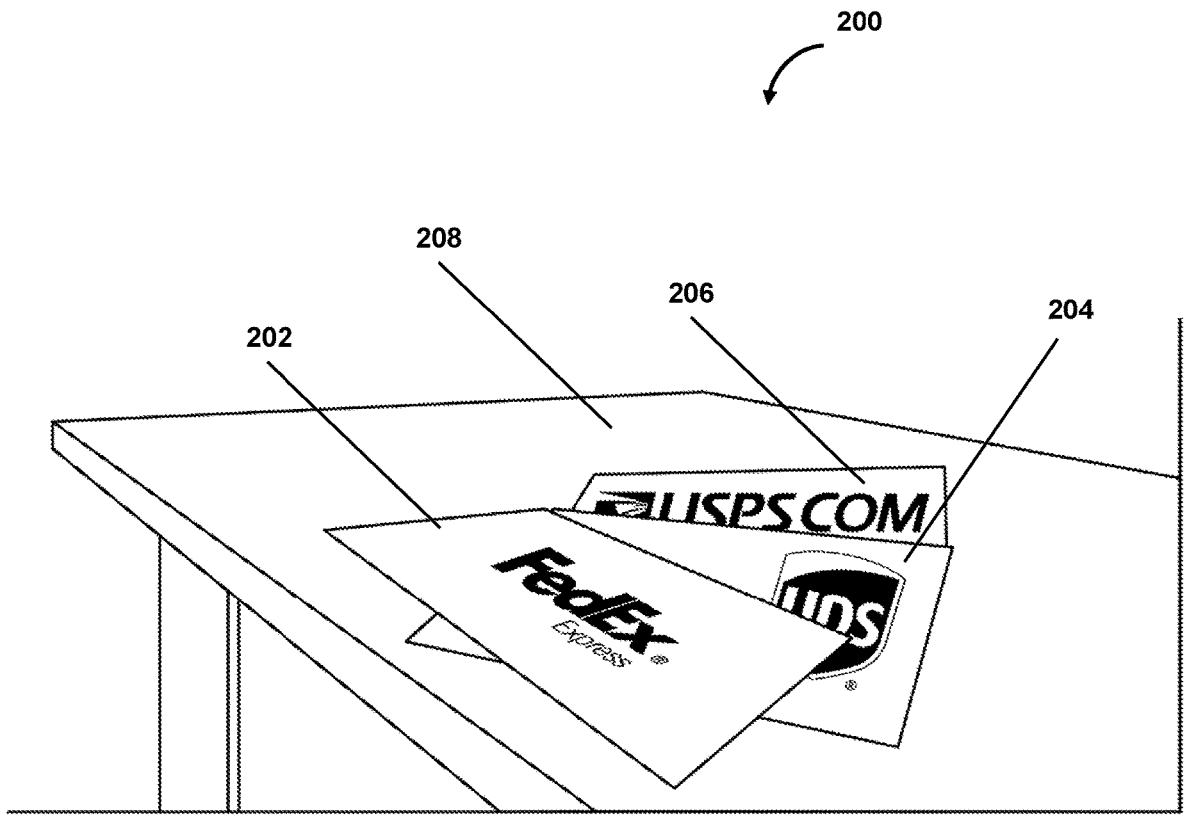
FIG. 2 shows an environment including a plurality of items, in accordance with one or more embodiments.
Figure 3A:
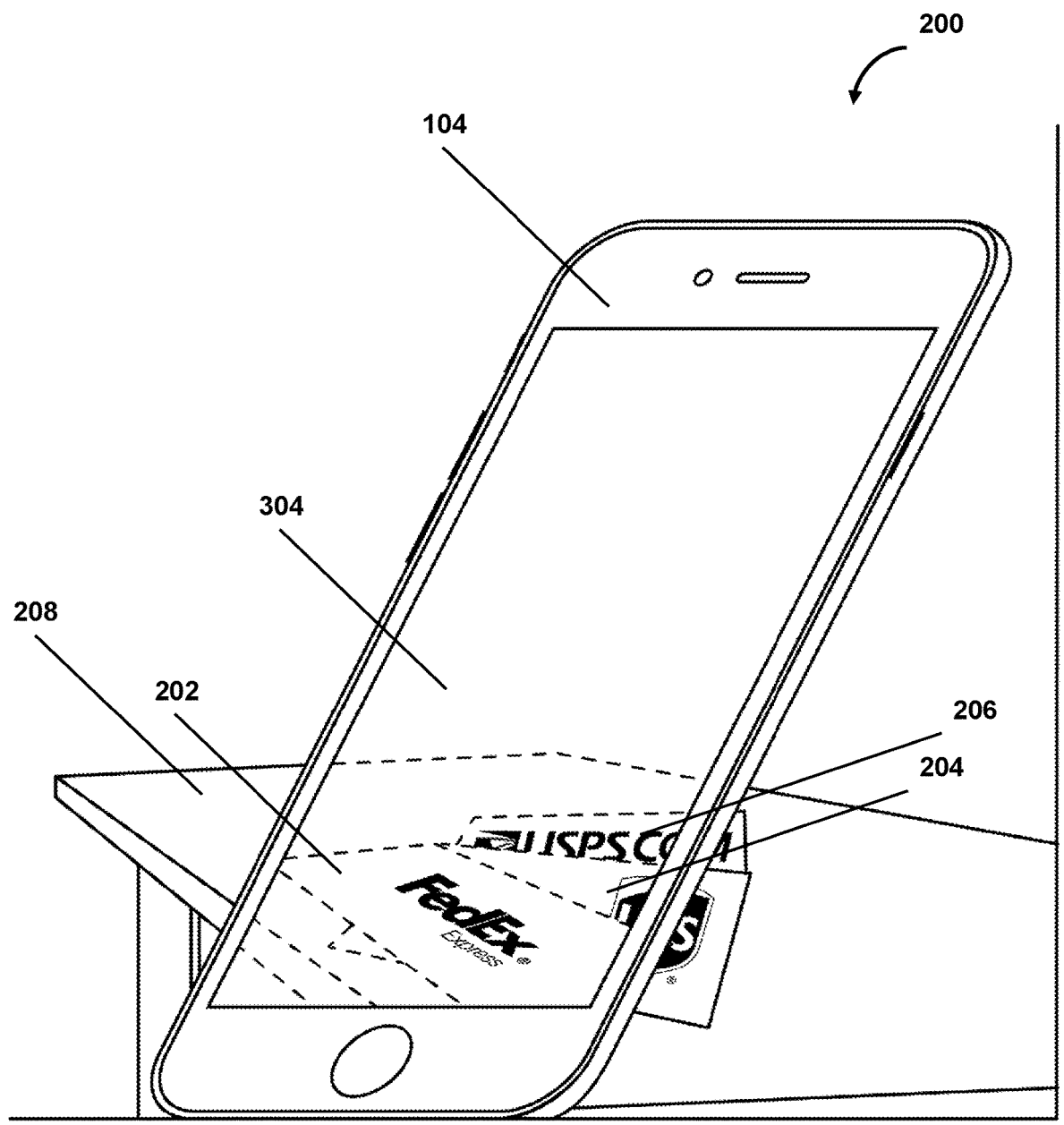
FIG. 3A shows an environment captured by a client device, in accordance with one or more embodiments.

As illustrated in FIG. 2, an environment 200 may include a plurality of items 202, 204, and 206 on a desk 208. In this example, the plurality of items 202, 204, and 206 correspond to shipping envelopes (or packages) associated with FedEx®, USPS®, and UPS®. However, it should be understood that the environment 200 may include any other item. As illustrated in FIG. 3A, a client device 104 (e.g., a camera associated with the client device 104) may stream a video or images 304 associated with the environment 200. In FIG. 3A, the environment 200 includes a plurality of items 202, 204, and 206 on a desk 208 and the client device 104 located in the environment 200 may capture the environment 200 via a camera (e.g., a camera associated with the client device 104) and send the captured video stream or images 304 to the computer system 102.

In some embodiments, the computer system 102 (e.g., pattern recognition subsystem 114) may continuously monitor the video stream or images 304 (e.g., obtained from the client device 104) for one or more patterns in the environment 200 in which the client device 104 is located. In some embodiments, the computer system 102 (e.g., pattern recognition subsystem 114) may compare each frame of the video stream or image 304 with a database (e.g., stored in memory 105 or database 132) of a plurality of frames of video streams or a plurality of images in order to detect one or more patterns in the frame of the video stream or image 304. In some embodiments, the computer system 102 (e.g., pattern recognition subsystem 114) may be detect one or more patterns in a frame of a video stream or an image via a trained machine learning model (e.g., stored in database 132 or memory 105).

Figure 4:
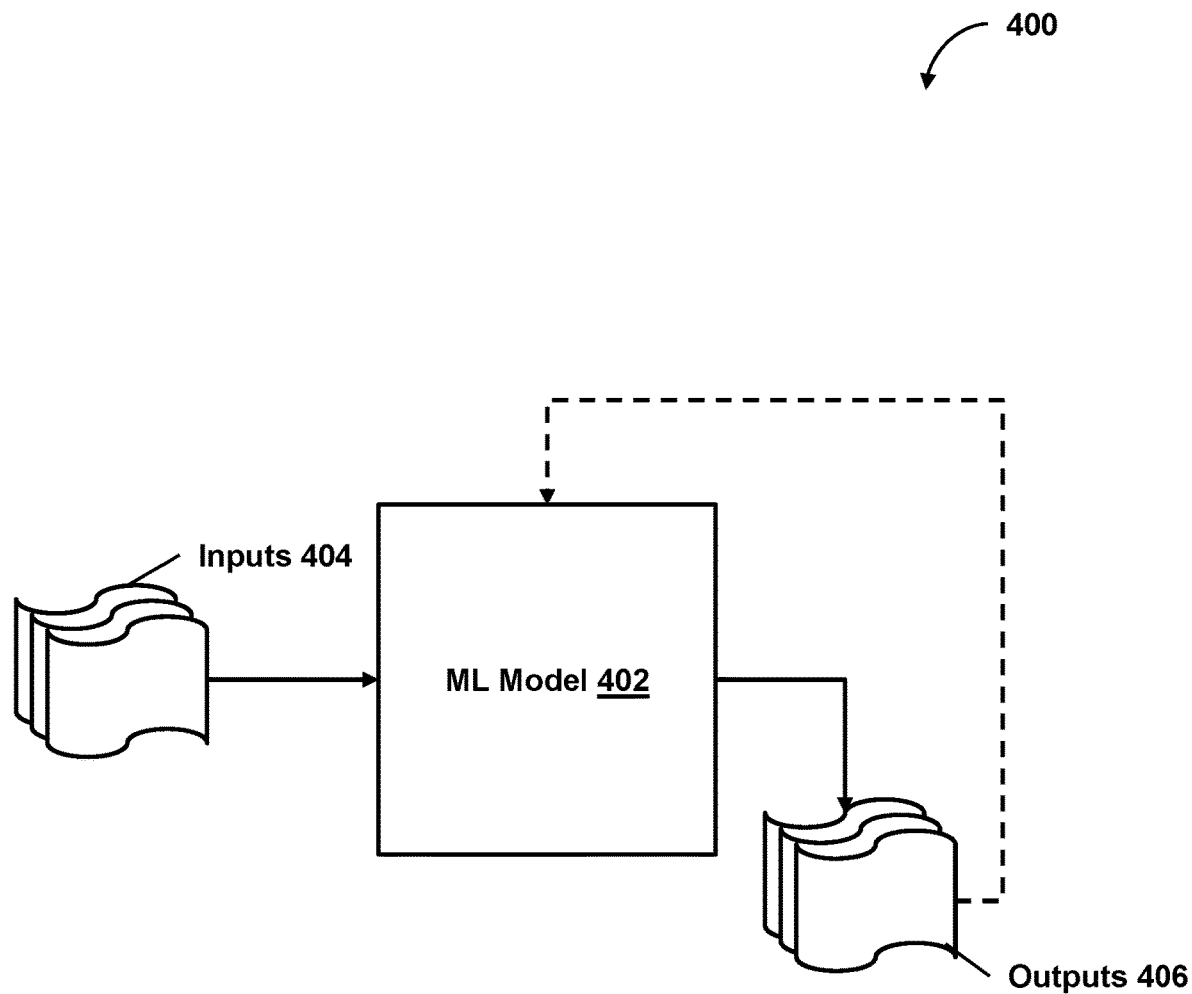
FIG. 4 shows a machine learning model system for detecting one or more patterns in a video stream, in accordance with one or more embodiments.

For example, FIG. 4 shows a machine learning model system 400 for detecting one or more patterns in a frame of a video stream or an image, in accordance with one or more embodiments. As an example, a machine learning model 402 may take inputs 404 and provide outputs 406. In one use case, outputs 406 may be fed back (e.g., active feedback) to machine learning model 402 as input to train machine learning model 402 (e.g., alone or in conjunction with user indications of the accuracy of outputs 406, labels associated with the inputs 404, or with other reference feedback information). In another use case, machine learning model 402 may update its configurations (e.g., weights, biases, or other parameters) based on its assessment of its prediction (e.g., outputs 406) and reference feedback information (e.g., user indication of accuracy, reference labels, or other information). In another use case, where machine learning model 402 is a neural network, connection weights may be adjusted to reconcile differences between the neural network's prediction and the reference feedback. In a further use case, one or more neurons (or nodes) of the neural network may require that their respective errors be sent backward through the neural network to them to facilitate the update process (e.g., backpropagation of error). Updates to the connection weights may, for example, be reflective of the magnitude of error propagated backward after a forward pass has been completed. In this way, for example, the machine learning model 402 may be trained to generate better predictions. For example, in some embodiments, inputs 404 may comprise a plurality of frames of video streams or a plurality of images. Reference feedback information 406 (which is fed back as input to the machine learning model 402) may include pattern information (e.g., an identification of an entity such a person, company, carrier, etc.) corresponding to each of the plurality of frames of the video streams or the plurality of images. Accordingly, when a frame of a video stream or an image is provided as input 404 to machine learning model 402, machine learning model 402 may provide an output 406 including pattern information (e.g., an identification of an entity such a person, company, carrier, etc.) associated with the input 404. In some embodiments, system 100 may include multiple models that are trained to output different predictions (e.g., the described above or other predictions).

In some embodiments, the computer system 102 (e.g., pattern recognition subsystem 114) may detect one or more patterns in the live video stream or image 304. For example, the computer system 102 (e.g., pattern recognition subsystem 114) may detect that the live video stream or image 304 includes a first pattern (e.g., a pattern corresponding to FedEx®) based on one or more methods described above or any other method of pattern recognition. In some embodiments, the computer system 102 (e.g., pattern recognition subsystem 114) may detect that the live video stream or image 304 includes a second pattern (e.g., a pattern corresponding to UPS®) and/or a third pattern (e.g., a pattern corresponding to USPS®) based on one or more methods described above or any other method of pattern recognition. Although items 204 and 206 are partially covered from a viewpoint of the client device 104 in FIG. 3A, the computer system 102 (e.g., pattern recognition subsystem 114) may detect that the live video stream or image 304 includes a partial pattern corresponding to the second pattern (e.g., a pattern corresponding to UPS®) and/or a partial pattern corresponding to the third pattern (e.g., a pattern corresponding to USPS®) based on one or more methods described above or any other method of pattern recognition.

In some embodiments, in response to a recognition of a first pattern in the live video stream or image 304, the computer system 102 (e.g., location determination subsystem 112) may obtain a location of the client device 104 or may determine a location of the client device 104. In some embodiments, the client device 104 may share its location (e.g., a GPS location) with the computer system 102. Alternatively, or additionally, the environment 200 may include a network of a plurality of devices (e.g., an indoor positioning system (IPS)) (not illustrated) that can locate the client device 104 within the environment 200. For example, based on a signal strength of the client device 104 detected by one or more of the plurality of devices of the IPS within the environment 200, the computer system 102 may determine the location of the client device 104, for example, within the environment 200 (e.g., an infrastructure, a warehouse, a building, etc.). In some embodiments, angle of arrival of a signal at the plurality of devices of the IPS from the client device 104 or a time of arrival of a signal at the plurality of devices of the IPS from the client device 104 may be used by the computer system 102 to determine a location of the client device 104 within an environment 200. In other words, the computer system 102 may communicate with such plurality of devices of the IPS in order to determine a location of the client device 104 within an environment 200. Accordingly, in some embodiments, the location of the client device 104 within an environment 200 may be obtained and/or determined by the computer system 102 (e.g., location determination subsystem 112). Although the above description indicates that the location of the client device 104 is obtained and/or determined in response to a detection of a first pattern in the live video stream or image 304, it should be understood that the location of the client device 104 may be obtained and/or determined by the computer system 102 prior to the detection of any pattern in the live video stream or image 304 or at any other time.

In some embodiments, in response to a detection of a first pattern in the video stream or image 304, the computer system 102 (e.g., location determination subsystem 112) may determine a second location (e.g., destination location) associated with the detected first pattern (or an item associated with the detected first pattern). In other words, the computer system 102 (e.g., location determination subsystem 112) may determine a second location (e.g., destination location) for relocating the item associated with the detected first pattern. For example, the memory 105 or database 132 may store location information (e.g., destination location information) corresponding to a plurality of patterns (or pattern information). In other words, memory 105 or database 132 may include information regarding destination location of a plurality of items associated with a plurality of patterns. Accordingly, in response to a detection of a first pattern in the video stream or image 304, the computer system 102 (e.g., location determination subsystem 112) may retrieve a destination location for an item associated with the detected first pattern (or corresponding to one or more patterns that match the detected first pattern) based on the information regarding destination locations stored in memory 105 or database 132.

In some embodiments, the location information associated with a plurality of patterns may be stored in the memory 105 or database 132 based on previous activity associated with items related to such patterns. For example, if a first set of items associated with a first pattern were previously relocated to a first location and a second set of items associated with a second pattern were previously relocated to a second location, the memory 105 or database 132 may store a correspondence between the first pattern and the first location (e.g., the first destination location) and between the second pattern and the second location (e.g., the second destination location). The computer system 102 can determine a destination location for a detected pattern based on such correspondences stored in memory 105 or database 132. It should be understood that the correspondences between patterns and destination locations may change with time (e.g., every day, every week, or any other time period) in view of, for example, items (associated with different patterns) being moved or relocated. Accordingly, the most up-to-date correspondence between patterns and destination locations may be used (e.g., by the location determination subsystem 112) in order to determine a destination location for a detected pattern.

In some embodiments, the computer system 102 (e.g., the pattern recognition subsystem 114) may detect a plurality of patterns in a live video stream or image 304 and may prioritize each pattern (or assign a priority to each pattern or assign priority to each item associated with a pattern) based on one or more factors. In other words, the computer system 102 (e.g., priority determination subsystem 122) may prioritize the relocation of an item associated with a pattern associated with a higher priority than relocation of another item associated with another pattern associated with a lower priority. In some embodiments, the computer system 102 may determine a destination location for each of the plurality of detected patterns (e.g., a destination location for relocating the items associated with the plurality of detected patterns). The destination locations may be associated with a status indicator indicating the status associated with each destination location. The computer system 102 (e.g., the status determination subsystem 120) may determine or retrieve a status (or status indicator) associated with each destination location. The status indicator may indicate whether the destination location is available for accepting the relocation of one or more items, whether a container associated with the destination location has space to include one or more items, whether other items from the destination location have been collected for further distribution (and if so, the time associated with such a collection), and/or a preset time for collecting the items from the destination location (e.g., a first carrier may collect items at or around a first preset time from a first destination location and a second carrier may collect items at or around a second preset time from a second destination location).

For example, if a status indicator for a first destination location indicates that a preset time for collecting items from the first destination location has passed and if the status indicator for a second destination location indicates that a preset time for collecting items from the second destination location has not passed, the computer system 102 (e.g., the priority determination subsystem 122) may assign a higher priority to a second pattern (associated with second destination location) detected in the live video stream or image and a lower priority to a first pattern (associated with the first destination location) detected in the live video stream or image. In other words, based on the status indicator for the first and second destination locations, the computer system 102 (e.g., priority determination subsystem 122) may determine that items from the second destination location are likely to be collected and/or distributed from the second destination location prior to items from the first destination location, and accordingly, may prioritize relocating the second item (associated with the second pattern) to the second destination location over relocating the first item (associated with the first pattern) to the first destination location.

In some embodiments, the status indicator may indicate whether a first destination location (associated with a first pattern detected in the live video stream or image) and a second destination location (associated with a second pattern detected in the live video stream or image) are available for accepting the relocation of one or more items. If the status indicator indicates that the second destination location is available for accepting one or more items and that the first destination location is not available for accepting one or more items, the computer system 102 (e.g., the priority determination subsystem 122) may prioritize the relocation of a second item associated with the second pattern over the relocation of a first item associated with the first pattern. In other words, the computer system 102 (e.g., priority determination subsystem 122) may prioritize the relocation of an item that is likely to be accepted at a destination location.

In some embodiments, the status indicator may indicate whether a first destination location (associated with a first pattern detected in the live video stream or image) and a second destination location (associated with a second pattern detected in the live video stream or image) have additional space to include one or more items in the first and second destination locations. If the status indicator indicates that the second destination location has space available for accepting one or more items and that the first destination location does not have space for accepting one or more items, the computer system 102 (e.g., the priority determination subsystem 122) may prioritize the relocation of a second item associated with the second pattern over the relocation of a first item associated with the first pattern. In other words, the computer system 102 (e.g., priority determination subsystem 122) may prioritize the relocation of an item to a location that has additional space to include one or more items.

In some embodiments, the status indicator may indicate a status of prior actions associated with a first set of items at the first destination (associated with a first pattern detected in the live video stream or image) and with a second set of items at the second destination (associated with a first pattern detected in the live video stream or image). If the status indicates that one or more items of the first set of items have been collected and distributed from the first destination (e.g., within a threshold amount of time) and if the status indicates that one or more items of the second set of items have not been collected and distributed (e.g., that the collection and distribution of one or more items of the second set of items is pending) from the second destination (e.g., within a threshold amount of time), the computer system 102 (e.g., the priority determination subsystem 122) may prioritize the relocation of a second item associated with the second pattern over the relocation of a first item associated with the first pattern. In other words, the computer system 102 (e.g., priority determination subsystem 122) may prioritize the relocation of an item to a location where the collection and distribution of items is pending or likely to happen in the near future.

Figure 3B:
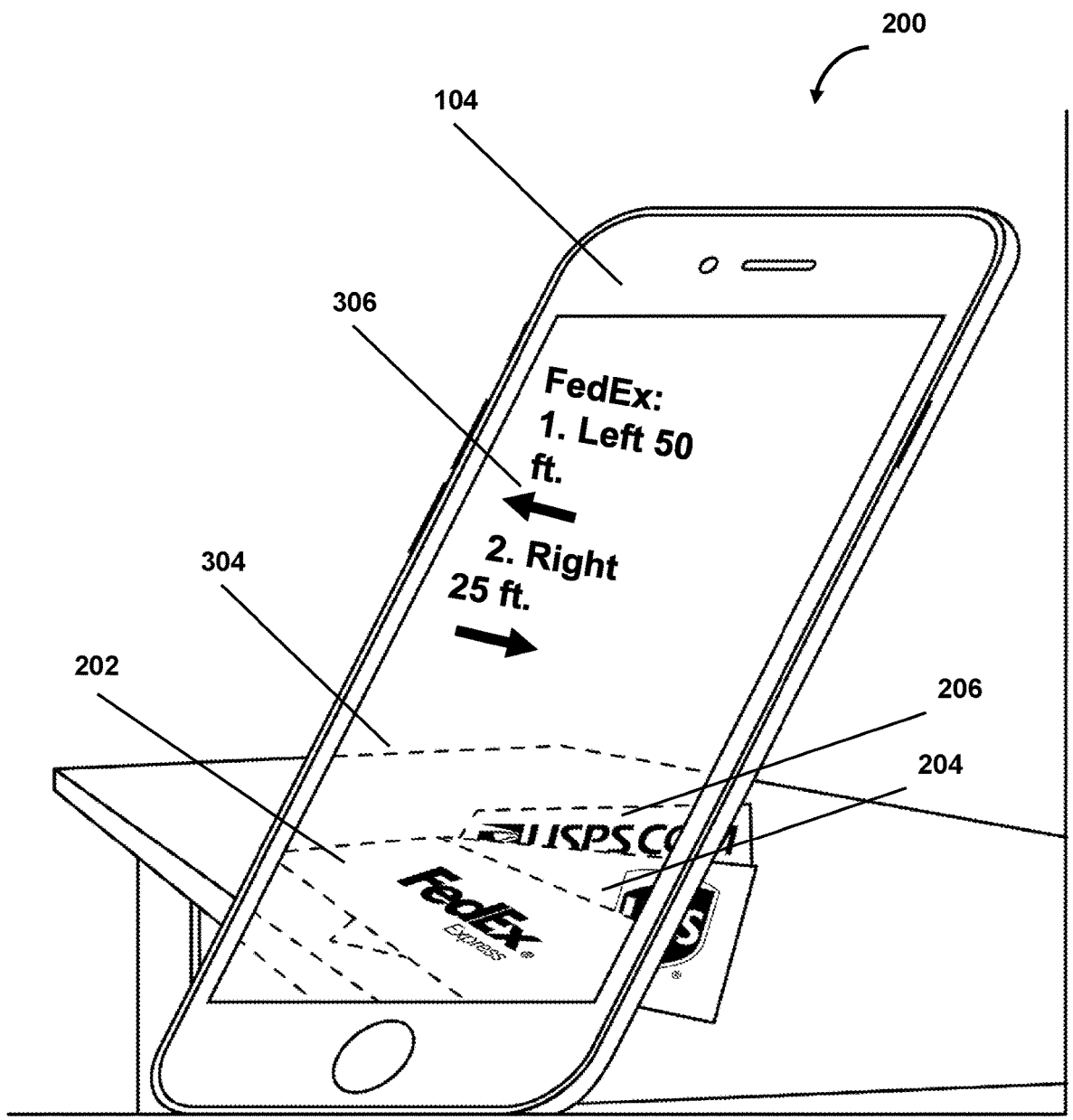
FIG. 3B shows an augmented reality presentation of a visual directional cue on a user interface of a client device, in accordance with one or more embodiments.

In some embodiments, in response to a detection of a first pattern in the video stream or image and/or in response to a determination that the detected first pattern is associated with (or assigned a) higher priority than one or more other detected patterns in the video stream or image, the computer system 102 (e.g., presentation subsystem 116) may determine a set of directions from the first location associated with the client device 104 (e.g., the location of the client device 104 in the environment 200) to the second location (e.g., a destination location for relocating an item associated with the detected first pattern), may generate an augmented reality presentation of a visual directional cue including visual directions from the first location of the client device 104 to the second location, and may cause the augmented reality presentation of the visual directional cue on a user interface of the client device 104 such that the visual directional cue is overlaid on a live video stream or image. As illustrated in FIG. 3B, the client device 104 may display an augmented reality presentation of visual directional cues 306 via the user interface of the client device 104, and such visual directional cues 306 may be overlaid on the live video stream or image 304. In some embodiments, the computer system 102 (e.g., presentation subsystem 116) may not determine a set of directions and may not generate an augmented reality presentation of a visual directional cue including visual directions for items associated with patterns that have a low priority. In other words, in response to a detection of a pattern (associated with a low priority) in a live video stream or an image, the computer system 102 may not determine a set of directions and may not generate an augmented reality presentation of a visual directional cue including visual directions for an item associated with such a detected pattern in order to focus the relocation of items that are of higher priority. Instead, in response to a detection of a pattern associated with a low priority, the computer system 102 (e.g., the presentation subsystem 116) may cause an augmented reality presentation of a notification (e.g., indicating that the item associated with the pattern (associated with a low priority) is not to be relocated at a current time) on the user interface of the client device 104 such that the notification is overlaid on the live video stream.

In some embodiments, the computer system 102 (e.g., the presentation subsystem 116) may update the augmented reality presentation of the visual directional cue 306 based on a change in the first location associated with the client device 104. In other words, the computer system 102 (e.g., location determination subsystem 112) may continuously monitor the location of the client device 104, and if the client device 104 has changed its location from the first location, the computer system 102 (e.g., presentation subsystem 116) may generate an updated augmented reality presentation of a visual directional cue including updated visual directions from the updated location of the client device 104 to the second location, and may cause the updated augmented reality presentation of the visual directional cue on the user interface of the client device 104 such that the updated visual directional cue is overlaid on the live video stream or image 304.

In addition, the computer system 102 (e.g., the presentation subsystem 116) may also identify an item (e.g., associated with the detected first pattern) in the live video stream or image 304 that needs to be relocated from the first location to the second location. In some embodiments, the computer system 102 (e.g., the presentation subsystem 116)

may cause the item associated with the detected first pattern to be highlighted (e.g., cause an augmented reality presentation of a highlight (or outline) over the item associated with the detected first pattern) such that the highlight (or outline) is overlaid on the video steam or image 304. Such highlighting (or outlining) provides a visual indication of the item associated with the visual directional cues 306. In other words, such highlighting provides a visual indication of an item that needs to be relocated. In some embodiments, the visual directional cues 306 may identify the item (e.g., by including a description of the item) that needs to be relocated from the first location to the second location. For example, the visual directional cues 306 may identify the item based on the detected pattern or other information to allow a user to physically select the item that needs to be relocated from the first location to the second location.

In some embodiments, the visual directional cues 306 may correspond to step by step directions from the first location to the second location. In some embodiments, the visual directional cues 306 may include a direction relative to the position of the client device 104 and the direction may be updated in response to a change in the location of the client device 104. For example, the visual directional cues 306 may indicate that the user should move 50 feet to the left along with the item associated with the detected first pattern and when the user has moved 50 feet to the left, the visual directional cues 306 may be updated to display another instruction (e.g., that the user should move 25 feet to the right along with the item).

In some embodiments, the amount of information presented via the visual directional cues 306 may be dependent on a size of a user interface associated with a client device 104. For example, the computer system 102 (e.g., presentation subsystem 116) may cause the augmented reality presentation of the visual directional cue on a user interface of the client device 104 such that an amount of information included in the visual directional cue that is overlaid on a live video stream or image is dependent on a size of the display associated with the client device 104. In other words, the computer system 102 may obtain display configuration information (e.g., a resolution (or display resolution or pixel dimensions) of a display of the client device 104, dimensions (or physical dimensions) of a display of the client device 104, aspect ratio of a display of the client device 104, pixel density (pixels per inch or pixels per centimeter) of a display of the client device 104, or area of a display of the client device 104) from the client device 104, and may determine an amount of information to be augmented to the live video stream or image 304 based on the display configuration information associated with the client device 104. This way, a smaller sized client device 104 may display less information than a larger sized client device 104. In some embodiments, the size of the font associated with the visual directional cues 306 may also be dependent on the display configuration information associated with the client device 104. This way, a smaller sized client device 104 may display the same information in a smaller font than a larger sized client device 104.

In some embodiments, the computer system 102 (e.g., location determination subsystem 112) may continuously monitor and/or determine the location associated with the client device 104 based on one or more techniques described above or any other location determination technique. The computer system 102 may obtain an indication from the client device 104 (or any other device) that the item associated with the detected first pattern has been relocated to the second location. In response to such an indication and in order to confirm whether such indication is accurate, the computer system 102 (e.g., confirmation subsystem 118) may determine whether the location of the client device 104 (e.g., at the time the indication (that the item associated with the detected first pattern has been relocated to the second location) is obtained or within a threshold amount of time after the indication is obtained by the computer system 102) is within a threshold distance from the second location (e.g., destination location associated with the item associated with the detected first pattern). In other words, the computer system 102 (e.g., confirmation subsystem 118) may determine whether the item (associated with the detected first pattern) has been relocated to the intended destination location in response to obtaining an indication, for example, from the client device 104 that the item has been relocated to the intended location.

Additionally, or alternatively, in some embodiments, the second location (e.g., the destination location for relocating the item associated with the detected first pattern) may include a weight sensor that senses the weight of items located at the second location. For example, the second location may include a container and a weight sensor associated with the container, and the weight sensor may detect the weight associated with the container and may correspond this information with the computer system 102. In some embodiments, in response to an indication from the client device 104 (or any other device) that the item associated with the detected first pattern has been relocated to the second location, the computer system 102 (e.g., confirmation subsystem 118) may determine whether the weight associated with the second location has changed (e.g., at the time the indication (that the item associated with the detected first pattern has been relocated to the second location) is obtained or within a threshold amount of time after the indication is obtained by the computer system 102) by a threshold amount.

Additionally, or alternatively, in some embodiments, the second location (e.g., the destination location for relocating the item associated with the detected first pattern) may include a camera that captures video and/or images. In some embodiments, in response to an indication from the client device 104 (or any other device) that the item associated with the detected first pattern has been relocated to the second location, the computer system 102 (e.g., confirmation subsystem 118) may determine whether a video or image captured by the camera at the second location (e.g., at the time the indication (that the item associated with the detected first pattern has been relocated to the second location) is obtained or within a threshold amount of time after the indication is obtained by the computer system 102) illustrates that the item has been relocated to the second location.

In some embodiments, the computer system 102 (e.g., confirmation subsystem 118) may determine whether or not to generate a confirmation that the item (e.g., associated with the detected first pattern) has been relocated to the second location based on a determination as to whether the location of the client device 104 is determined to be within a threshold distance from the second location, based on a determination as to whether the weight associated with the second location has changed by a threshold amount, and/or based on whether the video or image captured by the camera at the second location indicates that the item has been relocated to the second location. In response to a determination that the location of the client device 104 is within a threshold distance from the second location, a determination that the weight associated with the second location has changed by a threshold amount (e.g., the weight associated with the second location has increased at least by a threshold amount), and/or a determination that a video or image captured by the camera at the second location indicates that the item has been relocated to the second location, the computer system 102 (e.g., the confirmation subsystem 118) may generate a confirmation that the item has been relocated to the second location. The computer system 102 may stop causing an augmented reality presentation of a visual directional cue on a user interface of the client device 104 in response to the generated conformation that the item has been relocated to the second location.

In some embodiments, the generated confirmation may be sent to the client device 104 and/or stored in memory 105 or database 132. Further, in some embodiments, in response to a determination that the location of the client device 104 is not within a threshold distance from the second location, a determination that the weight associated with the second location has not changed by a threshold amount, and/or a determination that a video or image captured by the camera at the second location does not indicate that the item has been relocated to the second location, the computer system 102 (e.g., the confirmation subsystem 118) may generate a report and store such a report in memory 105 or database 132. The report may identify the item (and/or the detected pattern associated with the item) that was supposed to be relocated to the second location, identify the first location associated with the client device 104, identify the second location (e.g., the destination location), and identify the video or image associated with the item (and/or the detected pattern associated with the item). This way, the generated report may be accessed at a later time in order to troubleshoot the discrepancy between the indication from the client device 104 that the item associated with the detected first pattern has been relocated to the second location and computer system's determination that the that the item associated with the detected first pattern has not been relocated to the second location.

In some embodiments, computer system 102 (e.g., location determination subsystem 112) may determine a location associated with a detected pattern based on capacity (e.g., weight, volume, etc.) or other availabilities associated with the location. In some embodiments, although it may initially be determined to relocate an item to a given location, computer system 102 may modify the relocation for the item based on a detected lack of capacity or availability of other resources at the initially determined location. As an example, in response to a detection of a first pattern in a video stream or image, the computer system 102 may determine a second location (e.g., destination location) for relocating the item associated with the detected first pattern based on the second location being determined to have sufficient capacity (or other resources) for shipping or handling the item (e.g., determined to have at least a threshold amount of capacity or other resources, determined to currently be at or below a capacity limit, etc.). For example, the memory 105 or database 132 may store resource information (e.g., indicating capacity or other resources available at one or more locations), which may be dynamically updated (e.g., updated in real-time based on updates being pushed to such database, periodically updated via pull or push requests, or other automated basis). Computer system 102 may monitor such resource information (e.g., in real-time, periodically, or other automated basis) to determine whether to modify the relocation for the item. In one use case, for example, if computer system 102 determines that a delivery vehicle currently at the second location has reached (or is predicted to reach) a capacity limit or other resource limit (e.g., and no other delivery vehicle is currently available or will be available for a predetermined amount of time at the second location), computer system 102 may automatically modify the relocation of the item to another location (e.g., a location determined to currently have one or more delivery vehicles with sufficient capacity or other resources to ship or handle the item).

In some embodiments, the computer system 102 may obtain a live video stream or image (e.g., from a client device 104) and may monitor the live video stream or image for one or more barcodes. In response to a detection of a barcode in the live video stream or image, the computer system 102 (e.g., presentation subsystem 116) may cause an augmented reality presentation of visual directions from a first location (e.g., associated with the client device 104) to a second location of an item associated with the barcode. The location of an item associated with the detected barcode may be stored in memory 105 or database 132. In response to a scan of a stock keeping unit (SKU) associated with the item obtained via the client device 104 and/or in response to a scan of a location associated with the item obtained via the client device 104, the computer system 102 may generate a confirmation that the user has selected the correct item associated with the detected barcode. The computer system 102 (e.g., presentation subsystem 116) may cause a notification (e.g., indicating that the user associated with the client device 104 picked up the correct item) to be displayed via a user interface of the client device 104. The computer system 102 may then stop causing an augmented reality presentation of visual directions on a user interface of the client device 104.

In some embodiments, the computer system 102 may obtain a live video stream or image (e.g., from a client device 104) and may monitor the live video stream or image for one or more barcodes. In response to a detection of a barcode in the live video stream or image, the computer system 102 (e.g., presentation subsystem 116) may cause an augmented reality presentation of visual directions from a first location (e.g., associated with the client device 104) to a second location of an item associated with the barcode. In response to the second location not including the item associated with the detected barcode, the user of the client device may inform the computer system 102 that the item is not available. Accordingly, when the computer system 102 obtains another live video stream or image (e.g., from a client device 104) in which another barcode associated with the same item is detected, the computer system 102 (e.g., the presentation subsystem 116) may cause a visual indicator to be presented via the user interface of the client device, where the visual indicator indicates that the item is not available.

Figure 5:
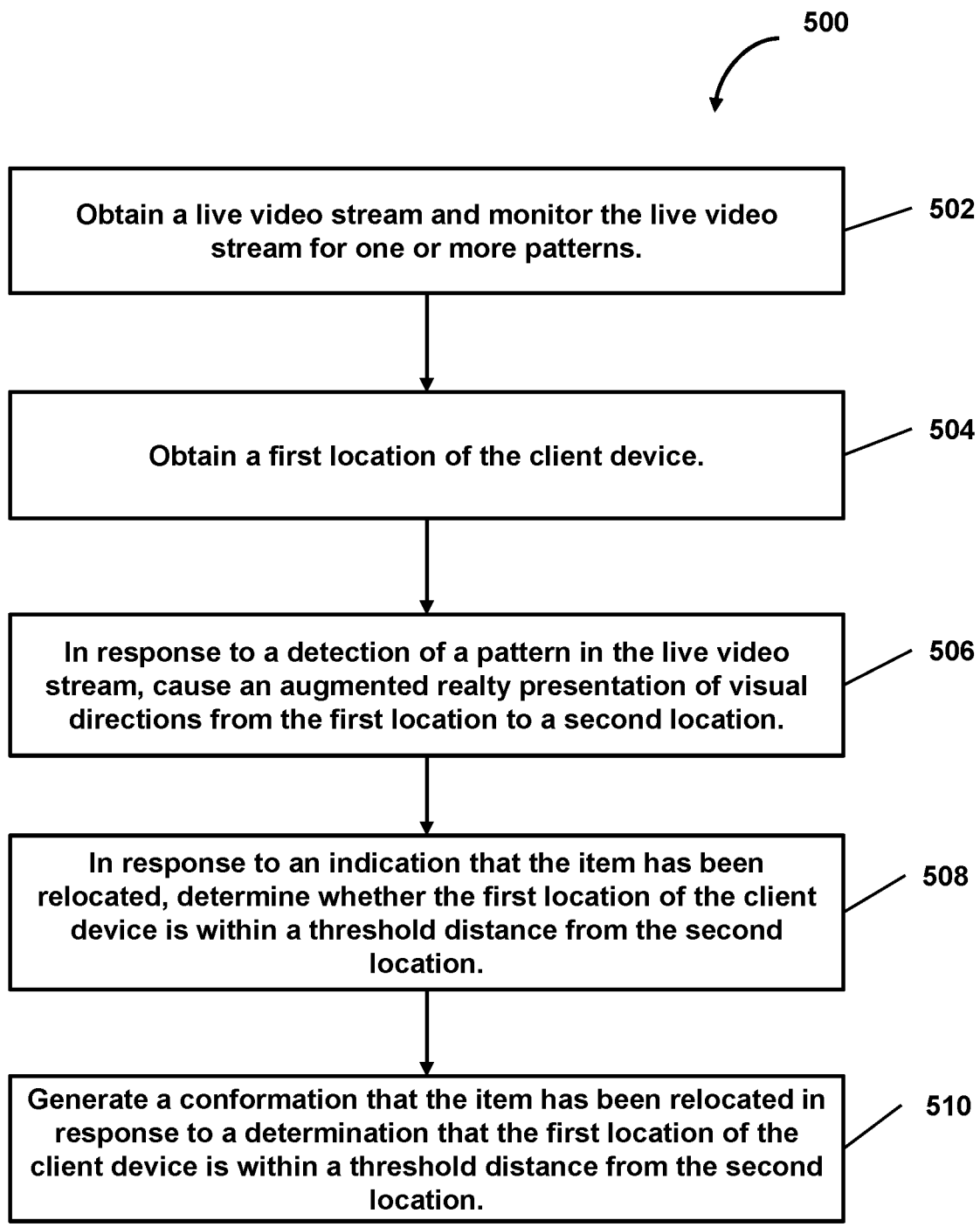
FIG. 5 shows a flowchart of a method for facilitating item relocation via augmented reality cues and location-based confirmation, in accordance with one or more embodiments.
Figure 6:
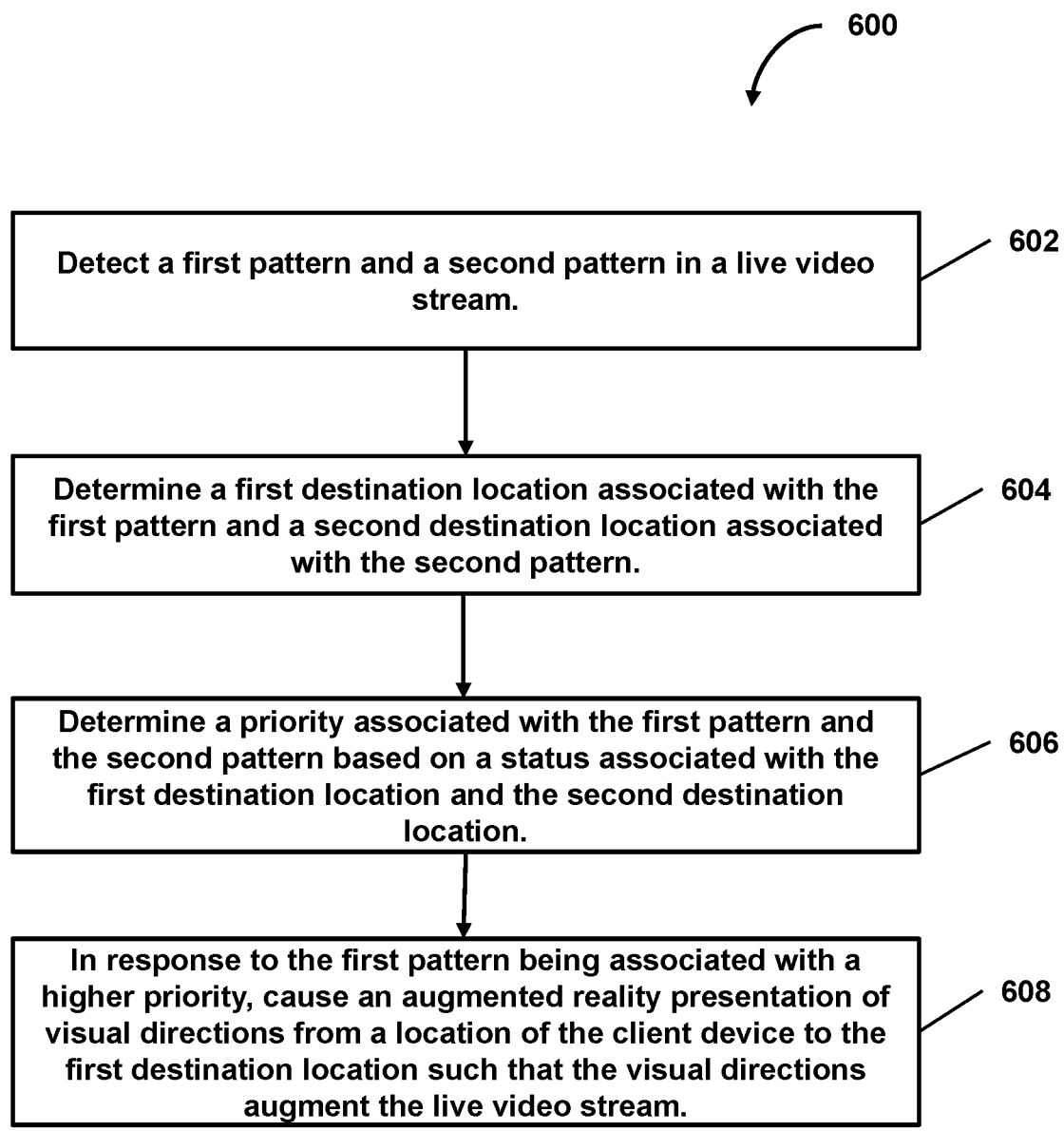
FIG. 6 shows a flowchart of a method for facilitating determination of a priority associated with a plurality of detected patterns and item relocation via augmented reality cues, in accordance with one or more embodiments.

FIGS. 5 and 6 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 5 shows a method 500 performed for facilitating item relocation via augmented reality cues and location-based confirmation. In step 502, a live video stream may be obtained via a client device and the live video stream may be monitored for one or more patterns. For example, a camera of a client device may capture the live video stream of an environment, which may include one or more items. In some embodiments, each frame of the live video stream may be compared with a database of a plurality of frames of video streams or a plurality of images in order to detect one or more patterns in the frames of the live video stream. In some embodiments, one or more patterns in a frame of a live video stream may be detected via a trained machine learning model. In step 504, a location of the client device may be obtained. The location of client device may be determined based on a global positioning system (GPS) signal associated with the client device or based on the client device's communication with an indoor positioning system (IPS).

In step 506, in response to a detection of a first pattern in the live video stream from the one or more patterns, an augmented reality presentation of a visual directional cue including visual directions from the first location of the client device to the second location may be generated, and the augmented reality presentation of the visual directional cue may be displayed on a user interface of the client device such that the visual directional cue is overlaid on the live video stream. In some embodiments, the augmented reality presentation of the visual directional cue may be updated based on a change in the first location associated with the client device. In step 508, in response to an indication obtained via the client device that the item has been relocated to the second location, a determination may be made as to whether the first location of the client device is within a threshold distance from the second location. In step 510, in response to a determination that the first location of the client device is within a threshold distance from the second location, a confirmation that the item has been relocated to the second location may be generated.

FIG. 6 shows a method 600 performed for facilitating determination of a priority associated with a plurality of detected patterns and item relocation via augmented reality cues. In step 602, a first pattern and a second pattern may be detected in a live video stream. In some embodiments, each frame of the live video stream may be compared with a database of a plurality of frames of video streams or a plurality of images in order to detect the first pattern and the second pattern in the live video stream. In some embodiments, the first and second patterns in the live video stream may be detected via a trained machine learning model. In step 604, a first destination location associated with the first pattern and a second destination location associated with the second pattern may be determined. In some embodiments, the location information associated with a plurality of patterns may be stored in a memory based on previous activity associated with items related to such patterns. For example, if a first set of items associated with a first pattern were previously relocated to a first location and a second set of items associated with a second pattern were previously relocated to a second location, the memory may store a correspondence between the first pattern and the first location (e.g., the first destination location) and between the second pattern and the second location (e.g., the second destination location). The first and second destination locations for the detected first and second patterns may be determined based on such correspondences stored in memory.

In step 606, a priority associated with each of the first pattern and the second pattern may be determined based on a status associated with the first destination location and the second destination location. The status associated with the first and second destination locations may indicate whether the destination locations are available for accepting the relocation of one or more items, whether containers associated with the destination locations have space to include one or more items, whether other items from the destination locations have been collected for further distribution (and if so, the time associated with such a collection), and/or a preset time for collecting the items from the destination locations (e.g., a first carrier may collect items at or around a first preset time from the first destination location and a second carrier may collect items at or around a second preset time from the second destination location).

In step 608, in response to the first pattern being associated with a higher priority, the client device may display an augmented reality presentation of visual directions from a location of the client device to the first destination location (e.g., associated with the first pattern) such that the visual directions augment the live video stream displayed via the user interface of the client device. Such an augmented reality presentation of visual directions may be updated in response to a change in location of the client device.

In some embodiments, system 100 may facilitate tracking-related prediction for shipped containers or other items. Traditional postal tracking computer systems enable their users (e.g., shippers of packages, recipients of packages, or other users) to access and view tracking information regarding their packages. Oftentimes, however, during a distribution center's processing of thousands of packages (as well as containers that each contain tracked packages) per day, the tracking barcodes (representing the tracking identifiers) of many such packages or other containers fail to be scanned, and, thus, no scan event indicating that those packages/containers arrived or departed the distribution center may be available, preventing the traditional postal tracking computer systems from providing their users with tracking information for those packages/containers with respect to that distribution center. When such packages/containers are shipped to a foreign country, the failure to scan may result in a long period of time during which users of the traditional postal tracking computer systems are unable to determine the current real status of their shipments (e.g., due to long delays resulting from customs or other reasons). The absence of additional information during such long time periods may lead to a poor user experience for customers of the shipper, customers of the postal carrier(s) delivering the packages/containers, and users of the postal tracking computer systems. As described herein, system 100 may facilitate tracking-related predictions to provide users with tracking information, for example, even when scan failures occur at one or more distribution centers or other locations at which packages/containers are to be scanned.

In some embodiments, system 100 may facilitate tracking-related prediction for shipped containers or other items. In some embodiments, a container may be a package that includes one or more shipped items. As an example, the container may be a tracked package or other tracked item (e.g., affixed with a tracking barcode or other representation of a tracking identifier, a postage indicia barcode or other representation of a postage indicia for the item, or other representation used for tracking the item). In some embodiments, a container may contain one or more containers in which one or more shipped items are contained. As an example, the container may be a tracked bag, a tracked pallet, a tracked box, or other container (e.g., with a tracking label) that contains one or more other tracked containers in which one or more shipped items are contained (e.g., where the items of the overall container are to be shipped to the same final destination or different final destinations). As another example, the container may contain a set of containers, where each container of the set of containers contains items that are to be shipped to a first location different from a second location that items contained in at least another container of the set of containers are to be shipped (e.g., a tracked bag or pallet may contain tracked packages that are to be shipped to different locations).

In some embodiments, system 100 may generate a prediction regarding a container or other item based on container/item shipping information, scan event information, routing information, or other information. The prediction may include (i) a prediction of which processing/distribution centers (or other places) the item has been or will be routed, (ii) an approximation of particular times at which the item is or will be located at respective locations (e.g., times of arrival at respective processing/distribution centers, times of departure from respective processing/distribution centers, etc.), (iii) an approximation of the total delivery time for the item or time of arrival of the item at its final destination, (iv) probabilities regarding the foregoing predictions, or (v) other prediction. As an example, system 100 may generate a prediction regarding the item being at a particular location, a prediction regarding the item being at a different location subsequent to the particular location, or other prediction. In some embodiments, the prediction may be generated without a scan event for the container occurring at the particular location or the subsequent location. Additionally, or alternatively, system 100 may not have obtained any user input (or other input) identifying that the container was actually at the particular location or the subsequent location at the time of the prediction (that the container was, is, or will be at the location or the subsequent location). As discussed below, in some embodiments, system 100 may use a prediction model to generate the prediction regarding the item, where the prediction is generated based on the foregoing information. It should be noted that, although some embodiments describe operations or other features for generating predictions regarding containers (e.g., shipped containers to be tracked), the operations/features may be utilized to generate predictions for other items (e.g., other shipped items to be tracked) in other embodiments to the extent possible.

Such information (on which a prediction is based) may include information related to items (e.g., containers or other items) that have reached its final destination at the time of the prediction, information related to items (e.g., containers or other items) that have not yet reached its final destination at the time of the prediction, or other information. The container/item shipping information may include information indicating (i) a destination associated with the item (e.g., the container), (ii) destinations associated with other items, (iii) an originating point associated with the item (e.g., the location of the initial scan of the item, the very first post office or other processing/distribution center at which the item is processed, etc.), (iv) originating points associated with other items, (v) a shipping service type associated with the item (e.g., Express Mail, Priority Mail, Priority Mail Flat Rate, First-Class Mail, Ground Shipping, Media Mail, or other shipping service type), (vi) shipping service types associated with other items, or (vii) other information. The scan event information may include information indicating one or more scan events that occurred at one or more locations, such as information identifying events identifiers for scan events (e.g., scans of containers or other items), cities, zip codes, or other location information corresponding to locations at which the scan events occurred, times at which the scan events occurred, tracking or other identifiers of containers scanned during the scan events, or other information. The routing information may include information indicating scheduled routes for shipping containers (or other items), predicted routes for shipping containers, actual routes taken to ship containers, or other information.

In some embodiments, data retrieval subsystem 124 may obtain container shipping information, scan event information, routing information, or other information (e.g., from shipping information database(s), from sensor devices 106, or other data source). Prediction subsystem 126 may generate one or more predictions based on the foregoing information. Presentation subsystem 116 may cause the predictions to be presented at a user interface for presentation to one or more users. In some embodiments, data retrieval subsystem 124 may continuously obtain the foregoing information. As an example, data retrieval subsystem 124 may obtain the foregoing information on a periodic basis (e.g., periodically pulling or being pushed such information every 5 seconds or less, 30 seconds or less, 1 minute or less, every hour or less, every day or less, every week or less, etc.), in accordance with a schedule, or based on other automated triggers. In some embodiments, prediction subsystem 126 may continuously generate predictions (or update the predictions) based on the continuously obtained information (e.g., as the information is being obtained in real-time). As an example, prediction subsystem 126 may generate or update the predictions on a periodic basis (e.g., every 5 seconds or less, 30 seconds or less, 1 minute or less, every hour or less, every day or less, every week or less, etc.), in accordance with a schedule, or based on other automated triggers. In some cases, the periodic basis, schedule, or other automated triggers for the generation/updating of the predictions may be different from the periodic basis, schedule, or other automated triggers for the obtainment of the foregoing information. Presentation subsystem 116 may cause the presentation of the predictions to be updated based on the continuous generation/updating of the predictions (e.g., to provide a real-time presentation of the generated/updated predictions).

In some embodiments, prediction subsystem 126 may aggregate container shipping information, scan event information, routing information, or other information associated with containers or other items. Based on the aggregated information, prediction subsystem 126 may determine past averages (e.g., unweighted averages, weighted averages, etc.), probabilities of achieving the past averages, or other information. Past averages may include average times to ship items from one distribution center to the next distribution center, average times to ship items from the items' originating points to their final destinations, or other averages. In some embodiments, prediction subsystem 126 may generate one or more predictions based on the determined averages. As an example, such predictions regarding a shipped container or other item may include (i) a prediction of which processing/distribution centers (or other places) the item has been or will be routed, (ii) an approximation of particular times at which the item is or will be located at respective locations, (iii) an approximation of the total delivery time for the item or time of arrival of the item at its final destination, (iv) probabilities regarding the foregoing predictions, or (v) other predictions.

In some embodiments, prediction subsystem 126 may aggregate multiple sets of container shipping information, scan event information, routing information, or other information (associated with containers or other items) based on similarities of (i) shipping service types associated with the items, (ii) the originating points associated with the items, (iii) the destinations associated with the items, (iv) routes taken to ship the items, (v) dates/times at which the items are shipped (e.g., holiday vs. non-holiday, high volume seasons or periods vs. low volume seasons or periods, etc.), or (vi) other aspects of the items. Prediction subsystem 126 may determine multiple sets of averages based on the sets of aggregated information, respectively, such that one of the sets of averages are determined from one of the sets of aggregated information and another one of the sets of averages are determined from another one of the sets of aggregated information. As an example, with respect to FIG. 7, (i) a first set of aggregated information may be aggregated from obtained information for items associated with a shipping type that is the same as or similar to a first shipping type and scanned at two or more locations (e.g., locations 702a and 702c of locations 702a-702h, an originating distribution center at which an item originates to a final distribution center from which the item is delivered to the receipt, or other locations), (ii) a second set of aggregated information may be aggregated from the obtained information for items associated with a shipping service type that is the same as or similar to a second shipping type and scanned at the two or more locations, (iii) a second set of aggregated information may be aggregated from the obtained information for items associated with a shipping service type that is the same as or similar to a third shipping type and scanned at the two or more locations, and (iv) so on. Prediction subsystem 126 may determine (i) a first set of averages for shipping items associated with a shipping service type that is the same or similar to the first shipping service type (e.g., an average amount of time to ship an item from a first location to a second location, an average amount of time to ship an item from the second location to the first location, respective probabilities that an item will ship between locations 702a and 702c in the foregoing average amounts of time, etc.) based on the first set of aggregated information, (ii) a second set of averages for shipping items associated with a shipping service type that is the same or similar to the second shipping service type based on the second set of aggregated information, (iii) a third set of averages for shipping items associated with a shipping service type that is the same or similar to the third shipping service type based on the third set of aggregated information, and (iv) so on.

As another example, respective sets of aggregated information may be aggregated from obtained information for items shipped during similar volume seasons or periods (e.g., for items shipped during the Christmas season, for items shipped after the Christmas season, for items shipped during a similar low volume season or period, etc.) (e.g., in addition or alternatively to the shipping service type criteria or scan location criteria described above). Prediction subsystem 126 may determine sets of averages for shipping items that are to be shipped during similar volume seasons or periods respectively based on the sets of aggregated information. Prediction subsystem 126 may generate one or more predictions based on the determined averages (e.g., predictions regarding a shipped container or other item as described herein).

In some embodiments, system 100 may use a prediction model to generate a prediction regarding a container (or other item) being at a particular location (e.g., a time of arrival at the location, a time of departure from the location, etc.), a prediction regarding the container being at a different location subsequent to the particular location (e.g., a time of arrival at the subsequent location, a time of departure from the subsequent location, etc.), or other prediction. In some embodiments, the prediction may be generated using the prediction model without a scan event for the container occurring at the particular location. As an example, when the prediction (e.g., that the container was, is, or will be at the location) is generated, no scan event for the container has occurred at the location (e.g., the container has not been scanned at the location) or some other issue occurred that prevented scan event information for the container at the location from being obtained. Additionally, or alternatively, system 100 may not have obtained any user input (or other input) identifying that the container was actually at the location at the time of the prediction (that the container was, is, or will be at the location). The prediction model used to generate the prediction model may be a neural network or other prediction model (e.g., machine-learning-based prediction model or other prediction model).

In some embodiments, a neutral network may be trained and utilized for predicting (i) which processing/distribution centers (or other locations) a container (or other item) has been or will be routed, (ii) particular times at which the container is or will be located at respective locations, (iii) the total delivery time for the container or time of arrival of the container at its final destination, (iv) probabilities regarding the foregoing predictions, or (v) other information. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neutral unit itself) may have a threshold function such that the signal must surpass the threshold before it is allowed to propagate to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

In some embodiments, system 100 may facilitate training of a neural network or other prediction model to generate predictions regarding one or more containers (or other items). In some embodiments, data retrieval subsystem 124 may obtain container shipping information, scan event information, routing information, or other information (e.g., from shipping database(s), from sensor devices 106, or other data source). The obtained information may include historical information (e.g., including information for containers that have been delivered to their final destinations), real-time information (e.g., including information for containers that have not yet been delivered to their final destinations), or other information. Model subsystem 128 may provide the obtained information as input to a neural network or other prediction model (e.g., as parameters or other type of input) to train the prediction model to predict shipping-related events. As an example, the scan event information may include information regarding 500 or more scan events, 1000 or more scan events, 10000 or more scan events, 100000 or more scan events, 1000000 or more scan events, or other number of scan events, where each of the scan events corresponds to a scan of a container at a processing/distribution center or other location (e.g., a pick-up location, the final destination, etc.). The container shipping information may include information indicating, for each container for which at least one of the scan events (e.g., the 500-1000000 or more scan events) has occurred at a processing/distribution center or other location, (i) a destination associated with the container, (ii) a shipping service type associated with the container, (iii) an originating point associated with the container, or (iv) other information. The routing information may include information indicating, for each container for which at least one of the scan events (e.g., the 500-1000000 or more scan events) has occurred at a processing/distribution center or other location, (i) a scheduled route for the container, (ii) a predicted route for the container (e.g., a route predicted dynamically based on prior routes taken by containers associated with similar aspects described herein), (iii) an actual route taken to ship the container, or (iv) other information.

In some embodiments, a neural network or other prediction model may be configured to apply one or more rules to its processing/analysis of information (e.g., information provided as input to train or update the prediction model or other information), such as (i) rules applying static or dynamic thresholds to identify and reduce the effect of outliers when training or updating itself (e.g., by giving outlier data outside a static or dynamic threshold range less weight compared to data within the threshold range, by giving such outlier data no weight, etc.), (ii) rules for considering seasonality or abnormal time periods, (iii) rules for generating notifications (e.g., automated notifications in response to the prediction model predicting a shipment to be late or other notifications), or (iv) other rules. In some embodiments, the prediction model may be configured to aggregate container shipping information, scan event information, routing information, or other information associated with containers or other items, and determine averages based on the aggregated information (e.g., in a same or similar manner as described herein with respect to operations of prediction subsystem 126).

In some embodiments, with respect to FIG. 4, a machine learning model 402 may take inputs 404 and provide outputs 406. In one use case, outputs 406 may be fed back (e.g., active feedback) to machine learning model 402 as input to train machine learning model 402 (e.g., alone or in conjunction with user indications of the accuracy of outputs 406, labels associated with the inputs 404, or with other reference feedback information). In another use case, machine learning model 402 may update its configurations (e.g., weights, biases, or other parameters) based on its assessment of its prediction (e.g., outputs 406) and reference feedback information (e.g., user indication of accuracy, reference labels, or other information). In another use case, where machine learning model 402 is a neural network, connection weights may be adjusted to reconcile differences between the neural network's prediction and the reference feedback. In a further use case, one or more neurons (or nodes) of the neural network may require that their respective errors be sent backward through the neural network to them to facilitate the update process (e.g., backpropagation of error). Updates to the connection weights may, for example, be reflective of the magnitude of error propagated backward after a forward pass has been completed. In this way, for example, the machine learning model 402 may be trained to generate better predictions. For example, in some embodiments, inputs 404 may comprise the foregoing container shipping information, scan event information, routing information, or other information (e.g., from shipping database(s), from sensor devices 106, or other data source). Machine learning model 402 may generate one or more predictions (e.g., predicted shipping-related events described herein) with respect to one or more items based on the inputs 404, and reference feedback information (e.g., actual scan events that occurred, user indications of accuracy of the predictions, etc.) may be provided to machine learning model 402 to enable machine learning model 402 to update its configurations based on the reference feedback information.

In some embodiments, data retrieval subsystem 124 may obtain container shipping information, scan event information, routing information, or other information regarding a first container and a second container (or other containers). In some embodiments, with respect to one or more items (or containers), such information may include one or more indications or confirmations that the items were dropped off at a pick-up or other location (e.g., a location at a facility where the items are to be picked up by one or more carrier vehicles). As an example, such indications or confirmations may be generated based on one or more users relocating the items to such pick-up (or other) location via the augmented reality system described herein. In some embodiments, prediction subsystem 126 may use a neural network or other prediction model (e.g., a prediction model trained as described herein) to generate a prediction regarding a container (or other item) being at a particular location, a prediction regarding the container being at a different location subsequent to the particular location, or other prediction. In some embodiments, the prediction may be generated using the prediction model without a scan event for the container occurring at the particular location. Additionally, or alternatively, the prediction may be generated using the prediction model without a scan event for the container occurring at the subsequent location.

In some embodiments, the container shipping information may include information indicating a first destination associated with the first container, a second destination associated with the second container, a first originating point associated with the first container, a second originating point associated with the second container, a first shipping service type associated with the first container, a second shipping service type associated with the second container, or other information. The scan event information may include information indicating a first-location scan event associated with the first container that occurred at a first location, a first-location scan event associated with the second container that occurred at the first location, and a second-location scan event associated with the first container that occurred at a second location. Prediction subsystem 126 may use the prediction model to generate a prediction regarding (i) the second container being at the second location subsequent to being at the first location, (ii) a prediction regarding the second container being at a third location subsequent to being at the second location, or (iii) other prediction. As an example, when the prediction (e.g., that the second container was, is, or will be at the second location or the third location) is generated, no scan event for the second container has occurred at the second location or the third location (e.g., the second container has not been scanned at the second location or the third location). Additionally, or alternatively, prediction subsystem 126 may not have obtained any user input (or other input) identifying that the second container was actually at the second location or the third location at the time of the prediction (e.g., that the second container was, is, or will be at the second location or the third location). Prediction subsystem 126 may, for example, provide the container shipping information and the scan event information (or other information) as input to the prediction model (e.g., as parameters or other type of input) to cause the prediction model to generate the prediction regarding the second container. The prediction model may output the prediction regarding the second container based on (i) the first container being associated with the first destination, (ii) the second container being associated with the second destination, (iii) the first-location scan event associated with the first container, (iv) the first-location scan event being associated with the second container, (v) the second-location scan event being associated with the first container, or (vi) other information.

Figure 7A:
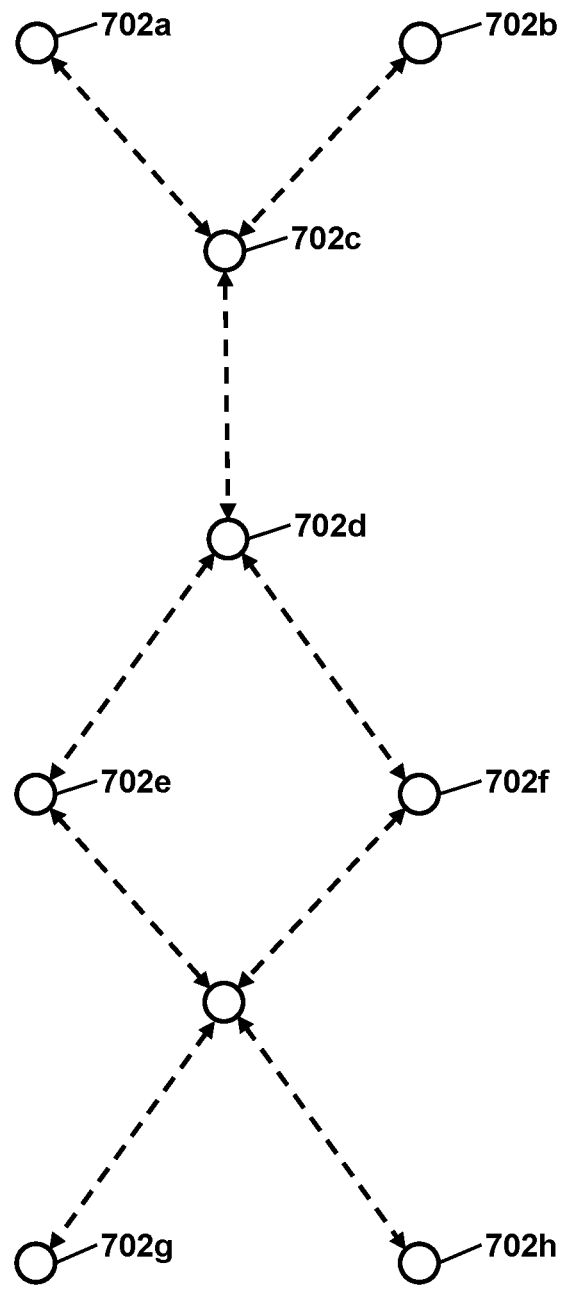
FIG. 7A shows a diagram depicting nodes representing locations at which a shipped container can be processed, edges representing relationships between the locations, and containers to be routed through one or more of the locations, in accordance with one or more embodiments.

In one use case, with respect to FIG. 7A, (i) first and second containers 712 and 714 (e.g., first and second tracked packages, first and second tracked bags that each contain one or more tracked packages, etc.) may be associated with the same or similar shipping service type (e.g., both are Priority Mail, both containers 712 and 714 are associated with shipping services having the same average shipping times, etc.), (ii) the originating processing/distribution center of first container 712 may be location 702a, (iii) the originating processing/distribution center of the second container 714 may be location 702b, and (iv) the final processing/distribution center of the first and second containers 712 and 714 may be location 702e (e.g., prior to the first and second containers 712 and 714 being respectively delivered to their intended recipients). Alternatively, the final processing/distribution center of first container 712 may be location 702e prior to first container 712 being respectively delivered to its intended recipient, and the final processing/distribution center of the second container 714 may be location 702f (e.g., prior to the second container 714 being respectively delivered to its intended recipient).

With respect to the foregoing use case, based on the origination/destination/service type information and routing information indicating that containers originating from locations 702a and 702b and destined for locations 702e and 702f are to be routed through locations 702c and 702d, a prediction model (e.g., a neural network) may generate a prediction that the first and second containers 712 and 714 will arrive and depart at location 702c at a similar time (e.g., the same day, within hours of one another, etc.) and at location 702d at a similar time. As an example, if first container 712 is scanned at location 702c to signal its arrival at location 702c, information regarding the scan event occurring at location 702c may be transmitted by a computer system (e.g., a client device, server, etc.) at location 702c to server(s) 102 (or shipping information database(s) or other data storage). Such scan event information may include information identifying an event identifier for the scan event, city, zip code, or other location information (e.g., identifier of processing/distribution center) corresponding to location 702c, the time at which the scan event occurred, tracking or other identifier of the first container, or other information. Prediction subsystem 126 may provide the scan event information to the prediction model. Even if the second container 714 is not scanned at location 702c (and no information identifying the second container 714 as being at location 702c is obtained by the prediction model), the prediction model may generate a prediction that the second container 714 arrived at location 702c at about the time of the scan event (of the first container) based on (i) a determination that first container 712 was scanned at location 702c and (ii) its prediction that the first and second containers 712 and 714 will arrive at location 702c at a similar time.

As another example, if both the first and second containers 712 and 714 are scanned at location 702c at about the same time to signal their arrival at location 702c, information regarding the scan events (for the two containers 712 and 714) occurring at location 702c may be transmitted by a computer system at location 702c to server(s) 102, and prediction subsystem 126 may provide the scan event information to the prediction model. Based on both the first and second containers 712 and 714 being scanned at location 702c at about the same time, the prediction model may increase its estimated probability that both the first and second containers 712 and 714 will arrive at location 702d at about the same time. As such, if first container 712 is scanned at location 702d to signal its arrival at location 702d, information regarding the scan event occurring at location 702d may be transmitted by a computer system at location 702d to server(s) 102, and prediction subsystem 126 may provide the scan event information to the prediction model. Even if the second container 714 is not scanned at location 70dc (and no information identifying the second container 714 as being at location 702d is obtained by the prediction model), the prediction model may generate a prediction that the second container 714 arrived at location 702d at about the time of the scan event (of the first container) based on (i) a determination that the first and second containers 712 and 714 was scanned at location 702c, (ii) a determination that first container 712 was scanned at location 702d, and (ii) its increased estimated probability that the first and second containers 712 and 714 will arrive at location 702d at a similar time.

In another use case, with respect to FIG. 7A, based on the origination/destination/service type information, the prediction model may generate a prediction of one or more routes to be taken to ship first and second containers 712 and 714. As an example, the prediction of the routes for first and second containers 712 and 714 may be based on (i) the shipping service types associated with first and second containers 712 and 714, (ii) the originating points associated with first and second containers 712 and 714, (iii) the destinations associated with first and second containers 712 and 714, (iv) dates/times at which first and second containers 712 and 714 are shipped, or (vi) other aspects of first and second containers 712 and 714. The route prediction for first container 712 may be based on past routes taken to ship prior containers (i) associated with the same or similar shipping service types as the shipping service type associated with first container 712, (ii) associated with the same or similar originating points as the originating point associated with first container 712, (iii) associated with the same or similar destinations as a destination associated with first container 712, (iv) shipped at similar dates/times relative to a given year as the date/time the first container 712 was shipped, or (iv) the like. The route prediction for second container 714 may be based on past routes taken to ship prior containers (i) associated with the same or similar shipping service types as the shipping service type associated with second container 714, (ii) associated with the same or similar originating points as the originating point associated with second container 714, (iii) associated with the same or similar destinations as a destination associated with second container 714, (iv) shipped at similar dates/times relative to a given year as the date/time the second container 714 was shipped, or (iv) the like. If, for example, the predicted routes for both containers 712 and 714 include one or more same locations, the prediction model may generate a prediction that first and second containers 712 and 714 will respectively arrive and depart those particular locations at similar times (e.g., the same day, within hours of one another, etc.).

Figure 7B:
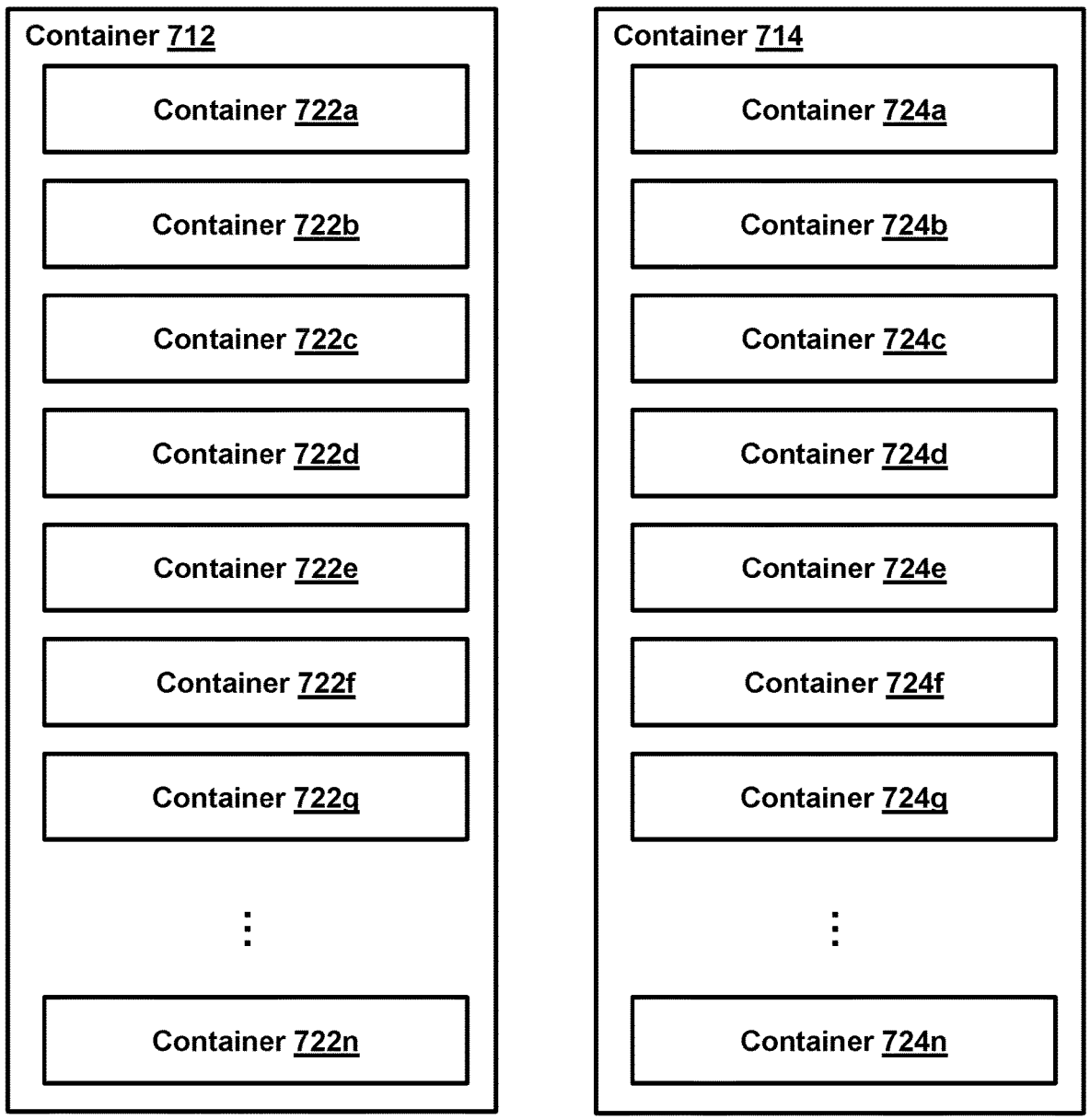
FIG. 7B shows containers that each contains one or more tracked containers, in accordance with one or more embodiments.

In a further use case, with respect to FIG. 7B, first container 712 may be a tracked container (e.g., a tracked bag, box, etc.) that contains tracked containers 722a-722n, and second container 714 may be a tracked container that contains tracked containers 724a-724n. As an example, first container 712 may be a container affixed with a first tracking barcode or other representation of a first tracking identifier, and second container 714 may be a container affixed with a second tracking barcode or other representation of a second tracking identifier. Each of the containers 722a-722n may be affixed with tracking barcodes or other representation of tracking identifiers that are different from one another and the first tracking barcode/representation. Each of the containers 724a-724n may be affixed with tracking barcodes or other representation of tracking identifiers that are different from one another and the second tracking barcode/representation. To facilitate tracking of containers 722a-722n and 724a-724n, the tracking identifiers of containers 722a-722n are stored in association with the tracking identifier of first container 712, and the tracking identifiers of containers 724a-724n are stored in association with the tracking identifier of second container 714. As such, tracking-related predictions made for first container 712 may be applied to containers 722a-722n (e.g., a prediction that first container 712 has arrived at a particular location results in a prediction that containers 722a-722n arrived at the location). Moreover, tracking-related predictions made for second container 714 may be applied to containers 724a-724n.

Figure 8:
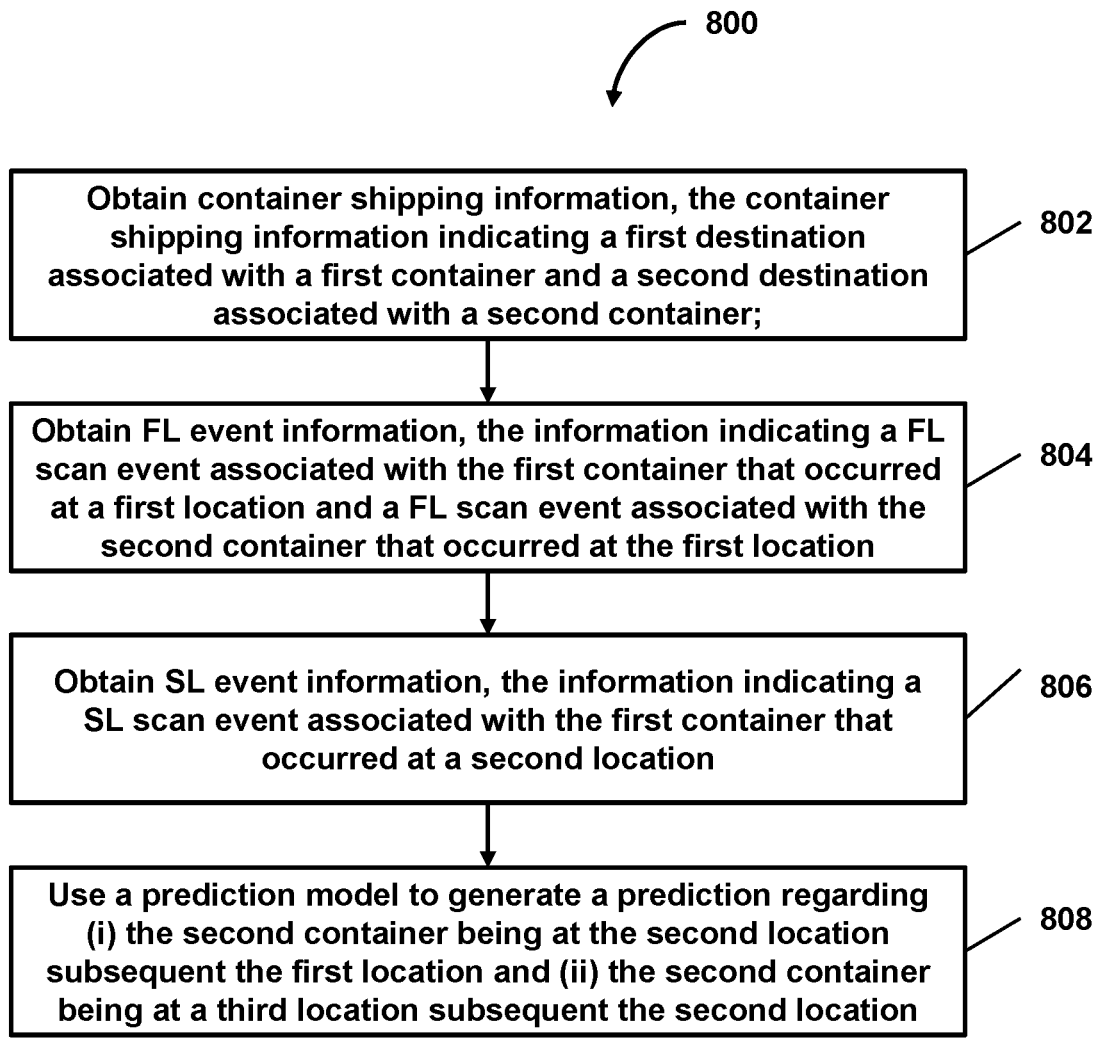
FIG. 8 shows a flowchart of a method of facilitating model-based tracking-related prediction for shipped containers, in accordance with one or more embodiments.
Figure 9:
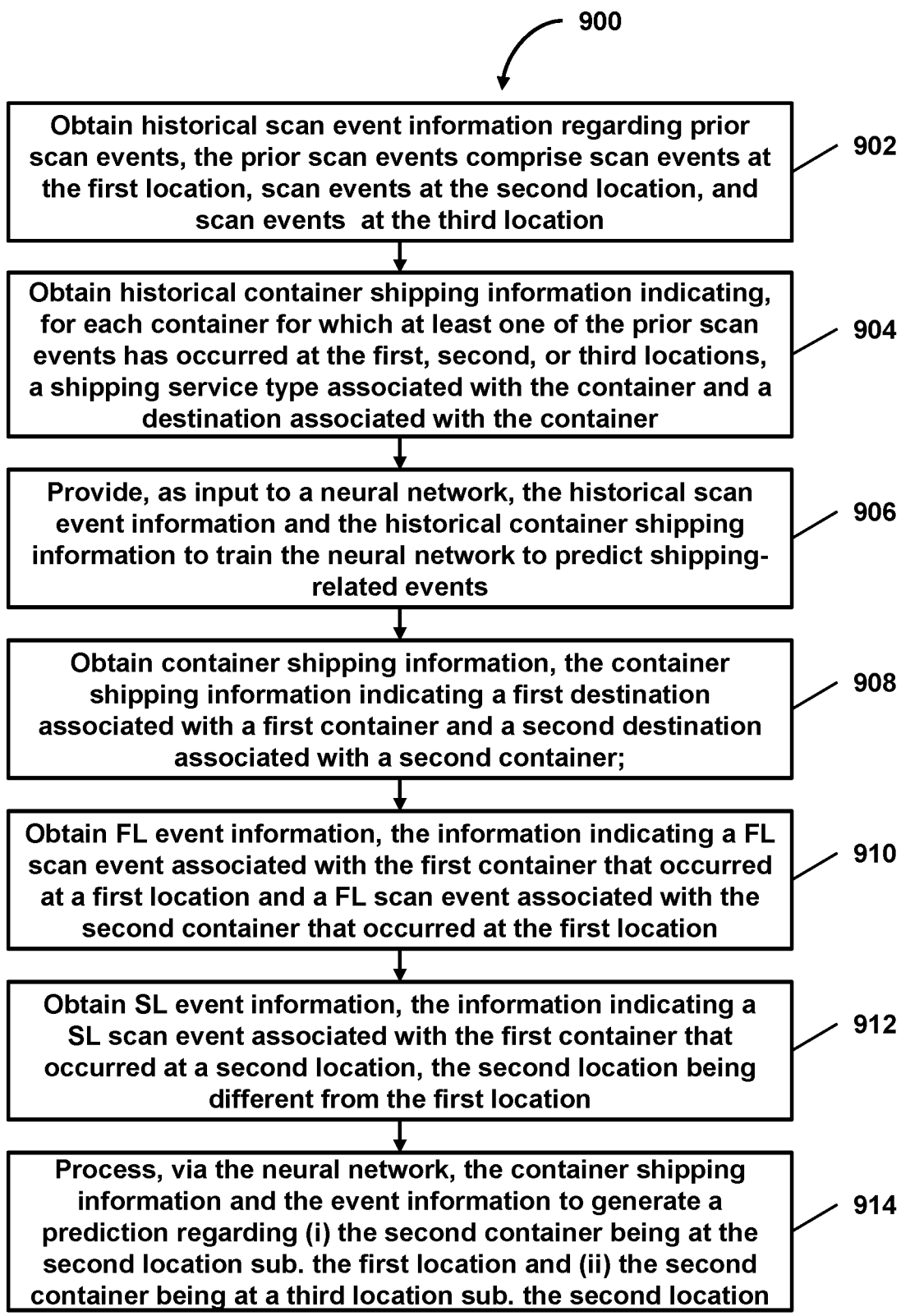
FIG. 9 shows a flowchart of a method of facilitating neural-network-based tracking-related prediction for shipped containers, in accordance with one or more embodiments.

FIGS. 8 and 9 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 8 shows a flowchart of a method 800 of facilitating model-based tracking-related prediction for shipped containers, in accordance with one or more embodiments. In an operation 802, container shipping information may be obtained. As an example, the container shipping information may indicate a first destination associated with a first container and a second destination associated with a second container (e.g., information identifying respective destination addresses to which the containers are to be shipped or other information). In one use case, a container may be a package that includes one or more shipped items. The container may, for example, be a tracked package or other tracked item (e.g., affixed with a tracking barcode or other representation of a tracking identifier, a postage indicia barcode or other representation of a postage indicia for the item, or other representation used for tracking the item). In another use case, a container may contain one or more containers in which one or more shipped items are contained. The container may, for example, be a tracked bag, a tracked pallet, a tracked box, or other container that contains one or more other tracked containers in which one or more shipped items are contained (e.g., where the items of the overall container are to be shipped to the same final destination or different final destinations). As another example, the container may contain a set of containers, where each container of the set of containers contains items that are to be shipped to a first location different from a second location that items contained in at least another container of the set of containers are to be shipped (e.g., a tracked bag or pallet may contain tracked packages that are to be shipped to different locations). Operation 802 may be performed by a subsystem that is the same as or similar to data retrieval subsystem 124, in accordance with one or more embodiments.

In an operation 804, first-location event information may be obtained. As an example, the first-location event information may indicate a first-location scan event associated with the first container that occurred at a first location and a first-location scan event associated with the second container that occurred at the first location (e.g., information identifying events identifiers for scan events, cities, zip codes, or other location information corresponding to locations at which the scan events occurred, times at which the scan events occurred, tracking or other identifiers of containers scanned during the scan events, or other information). Operation 804 may be performed by a subsystem that is the same as or similar to data retrieval subsystem 124, in accordance with one or more embodiments.

In an operation 806, second-location event information may be obtained. As an example, second-location event information may indicate a second-location scan event associated with the first container that occurred at a second location (e.g., information identifying events identifiers for the scan event, the place, city, zip code, or other location information corresponding to the second location as a location at which the scan event occurred, tracking or other identifier of the second container, or other information). Operation 806 may be performed by a subsystem that is the same as or similar to data retrieval subsystem 124, in accordance with one or more embodiments.

In an operation 808, a prediction model may be used to generate a prediction regarding the second container. As an example, the prediction may include a prediction regarding (i) the second container being at the second container being at the second location subsequent to being at the first location and (ii) the second container being at a third location subsequent to being at the second location. As an example, the prediction may be generated without a scan event for the second container occurring at the second location. As another example, the prediction may be generated without a scan event for the second container occurring at the third location. As another example, the prediction regarding the second container may be generated, using the prediction model, based on (i) the first container being associated with the first destination, (ii) the second container being associated with the second destination, (iii) the first-location scan event being associated with the first container, (iv) the first-location scan event being associated with the second container, and (v) the second-location scan event being associated with the first container. Operation 808 may be performed by a subsystem that is the same as or similar to prediction subsystem 126, in accordance with one or more embodiments.

FIG. 9 shows a flowchart of a method 900 of facilitating neural-network-based tracking-related prediction for shipped containers, in accordance with one or more embodiments. In an operation 902, historical scan event information regarding prior scan events may be obtained. As an example, each of the prior scan events may be for a container that has been delivered to its final destination. The prior scan events may comprise a first set of prior scan events occurring at the first location, a second set of prior scan events occurring at the second location, and a third set of prior scan events occurring at the third location. Operation 902 may be performed by a subsystem that is the same as or similar to data retrieval subsystem 124, in accordance with one or more embodiments.

In an operation 904, historical container shipping information may be obtained. As an example, the historical container shipping information may indicate, for each container for which at least one of the prior scan events has occurred at the first, second, or third locations, a shipping service type associated with the container and a destination associated with the container. Operation 904 may be performed by a subsystem that is the same as or similar to data retrieval subsystem 124, in accordance with one or more embodiments.

In an operation 906, the historical scan event information (including the first, second, and third sets of prior scan events) and the historical container shipping information (including the associated shipping service types and the associated destinations) may be provided as input to a neural network to train the neural network to predict shipping-related events. Operation 906 may be performed by a subsystem that is the same as or similar to model subsystem 128, in accordance with one or more embodiments.

In an operation 908, container shipping information may be obtained. As an example, the container shipping information may indicate a first destination associated with a first container and a second destination associated with a second container (e.g., information identifying respective destination addresses to which the containers are to be shipped or other information). Operation 908 may be performed by a subsystem that is the same as or similar to data retrieval subsystem 124, in accordance with one or more embodiments.

In an operation 910, first-location event information may be obtained. As an example, the first-location event information may indicate a first-location scan event associated with the first container that occurred at a first location and a first-location scan event associated with the second container that occurred at the first location (e.g., information identifying events identifiers for scan events, cities, zip codes, or other location information corresponding to locations at which the scan events occurred, times at which the scan events occurred, tracking or other identifiers of containers scanned during the scan events, or other information). Operation 910 may be performed by a subsystem that is the same as or similar to data retrieval subsystem 124, in accordance with one or more embodiments.

In an operation 912, second-location event information may be obtained. As an example, second-location event information may indicate a second-location scan event associated with the first container that occurred at a second location (e.g., information identifying events identifiers for the scan event, the place, city, zip code, or other location information corresponding to the second location as a location at which the scan event occurred, tracking or other identifier of the second container, or other information). Operation 912 may be performed by a subsystem that is the same as or similar to data retrieval subsystem 124, in accordance with one or more embodiments.

In an operation 914, the container shipping information and the event information (i.e., the first-location and second-location event information) may be processed via the neural network to generate a prediction regarding the second container. As an example, the prediction may include a prediction regarding (i) the second container being at the second container being at the second location subsequent to being at the first location and (ii) the second container being at a third location subsequent to being at the second location. As an example, the prediction may be generated without a scan event for the second container occurring at the second location. As another example, the prediction may be generated without a scan event for the second container occurring at the third location. As another example, the prediction regarding the second container may be generated, using the prediction model, based on (i) the first container being associated with the first destination, (ii) the second container being associated with the second destination, (iii) the first-location scan event being associated with the first container, (iv) the first-location scan event being associated with the second container, and (v) the second-location scan event being associated with the first container. Operation 914 may be performed by a subsystem that is the same as or similar to prediction subsystem 126, in accordance with one or more embodiments.

In some embodiments, the various computers and subsystems illustrated in FIG. 1 may include one or more computing devices that are programmed to perform the functions described herein. The computing devices may include one or more electronic storages (e.g., memory 105, database(s) 132, or other electronic storages), one or more physical processors programmed with one or more computer program instructions, circuitry, and/or other components. The computing devices may include communication lines or ports to enable the exchange of information within a network (e.g., network 152) or other computing platforms via wired or wireless techniques (e.g., Ethernet, fiber optics, coaxial cable, Wi-Fi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-128 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-128 described herein is for illustrative purposes, and is not intended to be limiting, as any of subsystems 112-128 may provide more or less functionality than is described. For example, one or more of subsystems 112-128 may be eliminated, and some or all of its functionality may be provided by other ones of subsystems 112-128. As another example, additional subsystems may be programmed to perform some or all of the functionality attributed herein to one of subsystems 112-128.

Although the present disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the scope of the appended claims. For example, it is to be understood that the present disclosure contemplates that, to the extent possible, one or more features of any embodiment can be combined with one or more features of any other embodiment.

The present techniques will be better understood with reference to the following enumerated embodiments:

A1. A method comprising: obtaining container shipping information, the container shipping information indicating a first destination associated with a first container and a second destination associated with a second container; obtaining first-location event information, the first-location event information indicating a first-location scan event associated with the first container that occurred at a first location and a first-location scan event associated with the second container that occurred at the first location; obtaining second-location event information, the second-location event information indicating a second-location scan event associated with the first container that occurred at a second location different from the first location; and using, without a second-location scan event for the second container occurring at the second location, a prediction model to generate a prediction regarding (i) the second container being at the second location subsequent to being at the first location and (ii) the second container being at a third location subsequent to being at the second location, the third location being different from the first and second locations, wherein the prediction regarding the second container is generated, using the prediction model, based on (i) the first container being associated with the first destination, (ii) the second container being associated with the second destination, (iii) the first-location scan event being associated with the first container, (iv) the first-location scan event being associated with the second container, and (v) the second-location scan event being associated with the first container.

A2. The method of embodiment A1, wherein the first and second containers each contain one or more containers in which one or more shipped items are contained.

A3. The method of any of embodiments A1-A2, wherein the generated prediction is an approximation of a time at which the second container is located at the second location and a future time at which the second container will be located at the third location, wherein the approximation is performed, using the prediction model, without a second-location scan event for the second container occurring at the second location, and wherein the approximation is performed, using the prediction model, based on (i) the first container being associated with the first destination, (ii) the second container being associated with the second destination, (iii) the first-location scan event being associated with the first container, (iv) the first-location scan event being associated with the second container, and (v) the second-location scan event being associated with the first container.

A4. The method of any of embodiments A1-A3, further comprising: predicting a first shipping route for the first container based on the first container being associated with the first destination, the predicted first shipping route comprising the first location and the second location; and predicting a second shipping route for the second container based on the second container being associated with the second destination, the predicted second shipping route comprising the first location, the second location, and the third location, wherein the prediction regarding the second container is generated, using the prediction model, based on (i) the first container being associated with the first destination, (ii) the second container being associated with the second destination, (iii) the first-location scan event associated with the first container, (iv) the first-location scan event associated with the second container, (v) the second-location scan event associated with the first container, and (vi) the predicted first and second shipping routes each comprising the first location and the second location.

A5. The method of any of embodiments A1-A4, wherein the container shipping information indicates a first shipping service type associated with the first container and a second shipping service type associated with the second container, and wherein the prediction regarding the second container is generated, using the prediction model, based on (i) the first container being associated with the first destination, (ii) the second container being associated with the second destination, (iii) the first-location scan event associated with the first container, (iv) the first-location scan event associated with the second container, (v) the second-location scan event associated with the first container, and (vi) the first container being associated with the first shipping service type, and (vii) the second container being associated with the second shipping service type.

A6. The method of embodiment A5, wherein the prediction regarding the second container is generated, using the prediction model, based on (i) the first container being associated with the first destination, (ii) the second container being associated with the second destination, (iii) the first-location scan event associated with the first container, (iv) the first-location scan event associated with the second container, (v) the second-location scan event associated with the first container, (vi) the first container being associated with the first shipping type and the second container being associated with the second shipping type, and (vii) a determination of a relatedness between the first and second shipping service types.

A7. The method of any of embodiments A1-A6, further comprising: obtaining scan event information regarding scan events, each of the scan events being for a container that has not yet been delivered to its final destination, the scan events comprise a first set of scan events occurring at the first location, a second set of scan events occurring at the second location, and a third set of scan events occurring at the third location, wherein the prediction regarding the second container is generated, using the prediction model, based on (i) the first container being associated with the first destination, (ii) the second container being associated with the second destination, (iii) the first-location scan event associated with the first container, (iv) the first-location scan event associated with the second container, (v) the second-location scan event associated with the first container, and (vi) the scan event information comprising the first, second, and third sets of scan events.

A8. The method of embodiment A7, wherein the container shipping information indicates, for each container for which at least one of the scan events has occurred at the first, second, or third locations, a shipping service type associated with the container, and wherein the prediction regarding the second container is generated, using the prediction model, based on (i) the first container being associated with the first destination, (ii) the second container being associated with the second destination, (iii) the first-location scan event associated with the first container, (iv) the first-location scan event associated with the second container, (v) the second-location scan event associated with the first container, (vi) the scan event information comprising the first, second, and third sets of scan events, and (vii) the shipping services types associated with the containers for which the scan events has occurred.

A9. The method of embodiment A1, further comprising: obtaining historical scan event information regarding prior scan events, each of the scan events being for a container that has been delivered to its final destination, the prior scan events comprising a first set of prior scan events occurring at the first location, a second set of prior scan events occurring at the second location, and a third set of prior scan events occurring at the third location, wherein the prediction regarding the second container is generated, using the prediction model, based on (i) the first container being associated with the first destination, (ii) the second container being associated with the second destination, (iii) the first-location scan event associated with the first container, (iv) the first-location scan event associated with the second container, (v) the second-location scan event associated with the first container, and (vi) the historical scan event information comprising the first, second, and third sets of prior scan events.

A10. A method comprising: obtaining historical scan event information regarding at least 1000 prior scan events, each of the 1000 prior scan events being for a container that has been delivered to its final destination, the 1000 prior scan events comprising a first set of prior scan events occurring at the first location, a second set of prior scan events occurring at the second location, and a third set of prior scan events occurring at the third location; obtaining historical container shipping information, the historical container shipping information indicating, for each container for which at least one of the 1000 prior scan events has occurred at the first, second, or third locations, a shipping service type associated with the container and a destination associated with the container; providing, as input to a neural network, (i) the historical scan event information comprising the first, second, and third sets of prior scan events and (ii) the historical container shipping information comprising the associated shipping service types and the associated destinations to train the neural network to predict shipping-related events; obtaining container shipping information, the container shipping information indicating a first destination associated with a first container and a second destination associated with a second container; obtaining scan event information, the scan event information indicating a first-location scan event associated with the first container that occurred at a first location, a first-location scan event associated with the second container that occurred at the first location, and a second-location scan event associated with the first container that occurred at a second location different from the first location; and processing, via the neural network, without a second-location scan event for the second container occurring at the second location, the container shipping information and the scan event information to generate a prediction regarding (i) the second container being at the second location subsequent to being at the first location and (ii) the second container being at a third location different from the first and second location subsequent to being at the second location, wherein the prediction regarding the second container is generated, using the neural network, based on (i) the first container being associated with the first destination, (ii) the second container being associated with the second destination, (iii) the first-location scan event being associated with the first container, (iv) the first-location scan event being associated with the second container, and (v) the second-location scan event being associated with the first container.

A11. The method of embodiment A10, further comprising: obtaining further scan event information regarding at least 1000 further scan events, each of the 1000 further scan events being for a container that has not yet been delivered to its final destination, the 1000 further scan events comprising a first set of further scan events occurring at the first location, a second set of further scan events occurring at the second location, and a third set of further scan events occurring at the third location; obtaining further container shipping information, the further container shipping information indicating, for each container for which at least one of the 1000 further scan events has occurred at the first, second, or third locations, a shipping service type associated with the container and a destination associated with the container; and providing, as input to the neural network, (i) the further scan event information comprising the first, second, and third sets of further scan events and (ii) the further container shipping information comprising the associated shipping service types and the associated destinations to train the neural network to predict shipping-related events.

A12. The method of embodiment A11, wherein the obtainment of the further scan event information, the obtainment of the further container shipping information, and the providing of the further scan event information and the further container shipping information is continuously performed to continuously update the neural network.

A13. The method of any of embodiments A10-A12, wherein the first and second containers each contain one or more containers in which one or more shipped items are contained.

A14. The method of any of embodiments A10-A13, wherein the generated prediction is an approximation of a time at which the second container is located at the second location and a future time at which the second container will be located at the third location, wherein the approximation is performed, using the neural network, without a second-location scan event for the second container occurring at the second location, and wherein the approximation is performed, using the prediction model, based on (i) the first container being associated with the first destination, (ii) the second container being associated with the second destination, (iii) the first-location scan event being associated with the first container, (iv) the first-location scan event being associated with the second container, and (v) the second-location scan event being associated with the first container.

A15. The method of any of embodiments A10-A14, further comprising: predicting a first shipping route for the first container based on the first container being associated with the first destination, the predicted first shipping route comprising the first location and the second location; and predicting a second shipping route for the second container based on the second container being associated with the second destination, the predicted second shipping route comprising the first location, the second location, and the third location, wherein the prediction regarding the second container is generated, using the neural network, based on the (i) the first container being associated with the first destination, (ii) the second container being associated with the second destination, (iii) the first-location scan event associated with the first container, (iv) the first-location scan event associated with the second container, (v) the second-location scan event associated with the first container, and (vi) the predicted first and second shipping routes each comprising the first location and the second location.

A16. The method of any of embodiments A10-A15, wherein the container shipping information indicates a first shipping service type associated with the first container and a second shipping service type associated with the second container, and wherein the prediction regarding the second container is generated, using the neural network, based on the (i) the first container being associated with the first destination, (ii) the second container being associated with the second destination, (iii) the first-location scan event associated with the first container, (iv) the first-location scan event associated with the second container, (v) the second-location scan event associated with the first container, and (vi) the first container being associated with the first shipping service type, and (vii) the second container being associated with the second shipping service type.

B1. A method comprising: obtaining, via a client device, a live video stream; obtaining a first location of the client device; and in response to a detection of a first pattern in the live video stream, causing a presentation of visual directions from the first location to a second location such that the visual directions and the live video stream are presented at a given time on a user interface, the second location corresponding to a location for relocating an item associated with the detected first pattern.

B2. The method of embodiment B1, further comprising: in response to an indication obtained via the client device that the item has been relocated to the second location, determining whether the first location of the client device is within a threshold distance from the second location; and in response to a determination that the first location of the client device is within the threshold distance from the second location, generating a confirmation that the item has been relocated to the second location.

B3. The method of any of embodiments B1-B2, further comprising: determining the second location for relocation of the item based on a location associated with one or more previously detected patterns that match the detected first pattern.

B4. The method of any of embodiments B1-B3, further comprising: monitoring the first location of the client device; updating the presentation of the visual directions in response to a change in the first location; and causing the updated augmented reality presentation of the visual directions such that the updated visual directions augment the live video stream.

B5. The method of any of embodiments B1-B4, further comprising: in response to a detection of a second pattern, causing an augmented reality presentation of a notification such that the notification augments the live video stream.

B7. The method of embodiment B5, wherein the notification indicates that another item associated with the second pattern is not to be relocated at a current time.

B8. The method of any of embodiments B1-B4, further comprising: detecting a second pattern in the live video stream; determining a third location for relocating another item associated with the detected second pattern; determining a priority associated with the first pattern and the second pattern based a status associated with each of the second location and the third location; and in response to the first pattern being associated with a higher priority, causing the presentation of the visual directions from the first location to the second location such that the visual directions augment the live video stream.

B9. The method of embodiment B8, wherein the status includes a status of prior actions associated with a first set of items at the second location and a second set of items at the third location.

B10. The method of embodiment B9, wherein the first pattern is associated with the higher priority when one or more of the second set of items at the third location have been collected from the third location and when collection of one or more of the first set of items at the second location is pending.

C1. A tangible, non-transitory, machine-readable medium storing instructions that when executed by a data processing apparatus cause the data processing apparatus to perform operations comprising those of any of embodiments A1-A16 and B1-10.

C2. A system, comprising: one or more processors; and memory storing instructions that when executed by the processors cause the processors to effectuate operations comprising those of any of embodiments A1-A16 and B1-10.

What is claimed is:
1. An augmented reality system for facilitating item relocation via augmented reality cues and location-based confirmation, the system comprising:

a computer system that comprises one or more processors programmed with computer program instructions that, when executed, cause the computer system to:
obtain, via a wearable device of a user, a live video stream representative of an environment in which the wearable device is located;
continuously monitor the live video stream for one or more patterns in the environment;
in response to a detection of a first pattern from the one or more patterns, obtain a first location of the wearable device and cause an augmented reality presentation of a visual directional cue on a user interface of the wearable device such that the visual directional cue is overlaid on the live video stream, the visual directional cue including visual directions from the first location of the wearable device to a second location, the second location corresponding to a location for relocating an item associated with the detected first pattern;
in response to an indication obtained via the wearable device that the item has been relocated to the second location, determine whether the first location of the wearable device is within a threshold distance from the second location; and
in response to a determination that the first location of the wearable device is within the threshold distance from the second location, generate a confirmation that the item has been relocated to the second location.

2. The system of claim 1, wherein the computer system is caused to:
determine the second location for relocation of the item based on a location associated with one or more previously detected patterns that match the detected first pattern.

3. The system of claim 1, wherein the computer system is caused to:
continuously monitor the first location of the wearable device;
update the augmented reality presentation of the visual directional cue in response to a change in the first location; and
cause the updated augmented reality presentation of the visual directional cue on the user interface of the wearable device such that the updated visual directional cue is overlaid on the live video stream.

4. The system of claim 1, wherein the computer system is caused to:
in response to a detection of a second pattern from the one or more patterns, cause an augmented reality presentation of a notification on the user interface of the wearable device such that the notification is overlaid on the live video stream.

5. The system of claim 4, wherein the notification indicates that another item associated with the second pattern is not to be relocated at a current time.

6. A method comprising:
obtaining, via a client device, a live video stream and monitoring the live video stream for one or more patterns;
obtaining a first location of the client device;
in response to a detection of a first pattern in the live video stream from the one or more patterns, causing an augmented reality presentation of visual directions from the first location to a second location such that the visual directions augment the live video stream, the second location corresponding to a location for relocating an item associated with the detected first pattern;
in response to an indication obtained via the client device that the item has been relocated to the second location, determining whether the first location of the client device is within a threshold distance from the second location; and
in response to a determination that the first location of the client device is within the threshold distance from the second location, generating a confirmation that the item has been relocated to the second location.

7. The method of claim 6, further comprising:
determining the second location for relocation of the item based on a location associated with one or more previously detected patterns that match the detected first pattern.

8. The method of claim 6, further comprising:
continuously monitoring the first location of the client device;
updating the augmented reality presentation of the visual directions in response to a change in the first location; and
causing the updated augmented reality presentation of the visual directions such that the updated visual directions augment the live video stream.

9. The method of claim 6, further comprising:
in response to a detection of a second pattern from the one or more patterns, causing an augmented reality presentation of a notification such that the notification augments the live video stream.

10. The method of claim 9, wherein the notification indicates that another item associated with the second pattern is not to be relocated at a current time.

11. The method of claim 6, further comprising:
detecting a second pattern in the live video stream from the one or more patterns;
determining a third location for relocating another item associated with the detected second pattern;
determining a priority associated with the first pattern and the second pattern based a status associated with each of the second location and the third location; and
in response to the first pattern being associated with a higher priority, causing the augmented reality presentation of the visual directions from the first location to the second location such that the visual directions augment the live video stream.

12. The method of claim 11, wherein the status includes a status of prior actions associated with a first set of items at the second location and a second set of items at the third location.

13. The method of claim 12, wherein the first pattern is associated with the higher priority when one or more of the second set of items at the third location have been collected from the third location and when collection of one or more of the first set of items at the second location is pending.

14. One or more non-transitory, computer-readable media storing instructions that, when executed by one or more processors, effectuate operations comprising:
obtaining, via a client device, a live video stream for one or more patterns;
obtaining a first location of the client device;
in response to a detection of a first pattern in the live video stream from the one or more patterns, causing an augmented reality presentation of visual directions from the first location to a second location such that the visual directions augments the live video stream, the second location corresponding to a location for relocating an item associated with the detected first pattern;

in response to an indication obtained via the client device that the item has been relocated to the second location, determining whether the first location of the client device is within a threshold distance from the second location; and in response to a determination that the first location of the client device is within the threshold distance from the second location, generating a confirmation that the item has been relocated to the second location.

15. The non-transitory, computer-readable media of claim 14, further comprising:

determining the second location for relocation of the item based on a location associated with one or more previously detected patterns that match the detected first pattern.

16. The non-transitory, computer-readable media of claim 14, further comprising:

continuously monitoring the first location of the client device;

updating the augmented reality presentation of the visual directions in response to a change in the first location; and causing the updated augmented reality presentation of the visual directions such that the updated visual directions augment the live video stream.

17. The non-transitory, computer-readable media of claim 14, further comprising:

in response to a detection of a second pattern from the one or more patterns, causing an augmented reality presentation of a notification such that the notification augments the live video stream.

18. The non-transitory, computer-readable media of claim 17, wherein the notification indicates that another item associated with the second pattern is not to be relocated at a current time.

19. The non-transitory, computer-readable media of claim 14, further comprising:

detecting a second pattern in the live video stream from the one or more patterns;

determining a third location for relocating another item associated with the detected second pattern;

determining a priority associated with the first pattern and the second pattern based a status associated with each of the second location and the third location; and in response to the first pattern being associated with a higher priority, causing the augmented reality presentation of the visual directions from the first location to the second location such that the visual directions augment the live video stream.

20. The non-transitory, computer-readable media of claim 19, wherein the status includes a status of prior actions associated with a first set of items at the second location and a second set of items at the third location.

* * * * *